United States Patent
Thompson et al.

(10) Patent No.: US 7,921,138 B2
(45) Date of Patent: Apr. 5, 2011

(54) COMMENT PROCESSING

(75) Inventors: Peter A Thompson, Redmond, WA (US); Jan Anders Nelson, Gig Harbor, WA (US); Leanne Brodzinski, Sammamish, WA (US); David Ahs, Dublin (IE); Jordi Mola Marti, Redmond, WA (US); Jason Kepner, Snoqualmie, WA (US); Ramakrishna Pamarthi, Bellevue, WA (US); Terry Farrell, Dublin (IE); Shashidhar P Jade, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 251 days.

(21) Appl. No.: 11/335,279

(22) Filed: Jan. 18, 2006

(65) Prior Publication Data

US 2007/0061350 A1 Mar. 15, 2007

Related U.S. Application Data

(60) Provisional application No. 60/716,295, filed on Sep. 12, 2005.

(51) Int. Cl.
*G06F 7/00* (2006.01)
*G06F 17/30* (2006.01)
(52) U.S. Cl. ........................ 707/802; 717/122
(58) Field of Classification Search .................. 715/513; 707/101; 717/122
See application file for complete search history.

(56) References Cited

U.S. PATENT DOCUMENTS

| | | | |
|---|---|---|---|
| 5,960,198 A * | 9/1999 | Roediger et al. | 717/130 |
| 6,678,882 B1 | 1/2004 | Hurley et al. | |
| 6,859,820 B1 | 2/2005 | Hauduc et al. | |
| 6,944,846 B2 | 9/2005 | Ryzhov | |
| 7,007,026 B2 | 2/2006 | Wilkinson et al. | |
| 7,516,442 B2 | 4/2009 | Wu et al. | |

(Continued)

FOREIGN PATENT DOCUMENTS

EP 1302867 A2 4/2003

(Continued)

OTHER PUBLICATIONS

Reid, John, XLIFF 1.0 Specification, Apr. 27, 2001, OASIS, Version 1.0, p. 1-2, 10, 22-23, 27, & 32.*

(Continued)

*Primary Examiner* — Kuen S Lu
*Assistant Examiner* — Rachel J Lee
(74) *Attorney, Agent, or Firm* — Wolf, Greenfield & Sacks, P.C.

(57) ABSTRACT

Methods, apparatus, and computer-readable media employing computer-readable components for localization of data included in software programs are described. The computer-readable components comprise data elements defined based on a software data schema; and an owned comment data element comprising information about the localization of the data included in the software programs and an associated owner with permission to create, access, and manipulate the owned comment data element. The owned comment data element is included in other data elements. The owned comment data element may also be included in a list of owned comment elements comprising at least one owned comment data element.

18 Claims, 19 Drawing Sheets

U.S. PATENT DOCUMENTS

| | | |
|---|---|---|
| 2003/0004703 A1 | 1/2003 | Prabhakar et al. |
| 2003/0046670 A1 | 3/2003 | Marlow |
| 2003/0084401 A1 | 5/2003 | Abel |
| 2003/0115186 A1 | 6/2003 | Wilkinson et al. |
| 2003/0126559 A1 | 7/2003 | Fuhrmann |
| 2003/0131320 A1 | 7/2003 | Kumhyr et al. |
| 2003/0135501 A1 | 7/2003 | Frerebeau et al. |
| 2004/0088155 A1 | 5/2004 | Kerr et al. |
| 2005/0050526 A1 | 3/2005 | Dahne-Steuber et al. |
| 2005/0066315 A1 | 3/2005 | Nguyen et al. |
| 2005/0108433 A1 | 5/2005 | Wu et al. |
| 2005/0114445 A1 | 5/2005 | Tracton et al. |
| 2005/0114446 A1 | 5/2005 | Hauduc et al. |
| 2006/0059424 A1 | 3/2006 | Petri et al. |
| 2006/0130032 A1 | 6/2006 | McHugh et al. |
| 2006/0195831 A1 | 8/2006 | Bossom et al. |
| 2006/0287844 A1 | 12/2006 | Rich |

FOREIGN PATENT DOCUMENTS

| | | |
|---|---|---|
| EP | 1333374 | 8/2003 |
| WO | WO01/73609 A1 | 10/2001 |

OTHER PUBLICATIONS

Murata et al., XML Access Control Using Static Analysis, Oct. 27-31, 2003, ACM Portal, p. 76.*

Fontaine, Robin, Merging XML files: a new approach providing intelligent merge of XML data sets, 2002, XML Europe 2002, p. 1, 4, 19-20.*

Bray et al., Extensible Markup Language (XML) 1.1, Apr. 15, 2004, W3C, Version 1.1, p. 4, 6, 13, 29, & 49-50.*

IMS, IMS Question & Test Interoperability: ASI XML Binding Specification, Feb. 11, 2002, IMS Global Learning Consortium, Inc., p. 16.*

Leslie, Donald, Using Javadoc and XML to Produce API Reference Documentation, Oct. 20-23, 2002, ACM Portal, p. 104, & 106-107.*

Guetari, Ramzi, XML as a Dynamic UI and Database access Customization Mean, 2003, IEEE.*

Savourel, Yves, TMX 1.4b Specification, Apr. 26, 2005, OSCAR.*

Lindholm, Tancred, A Three-way Merge for XML Documents, Oct. 28-30, 2004, ACM Portal.*

Gabillon, Alban, "An Authorization Model for XML Databases," 2004, ACM, pp. 16-28.*

Cheng, Tao, "XUL—Creating Localization XML GUI," 1999, 15$^{th}$ International Unicode Conference.*

Baquero et al., "Using Structural Characteristics for Autonomous Operation," ACM SIGOPS, 1999.*

Frimannsson, Asgeir, "Adopting Standards Based XML File Formats in Open Source Localisation," Queensland University of Technology, Jun. 2005.*

Komvoteas, "XML Diff and Patch Tool," Master of Science in Distributed and Multimedia Information Systems, 2003.*

Tichy, "RCE-A System for Version Control," Department of Computer Sciences, Purdue University, 1991.*

PCT/US2006/035691, International Search Report and Written Opinion, Korean IPO, Feb. 7, 2007.

IBM Technical Disclosure Bulletin, "XML translation for block structured languages," Issue 444, Apr. 1, 2001.

First Office Action from Chinese Patent Application 200680033200.0, Jul. 31, 2009. Translation included.

Second Office Action from Chinese Patent Application 200680033200.0, Jan. 8, 2010. Translation included.

Supplementary European Search Report from European Patent Application EP06814600, Dec. 9, 2008.

International Search Report from International Application PCT/US2006/035691, Feb. 7, 2007.

Written Opinion from International Application PCT/US2006/035691, Feb. 7, 2007.

* cited by examiner

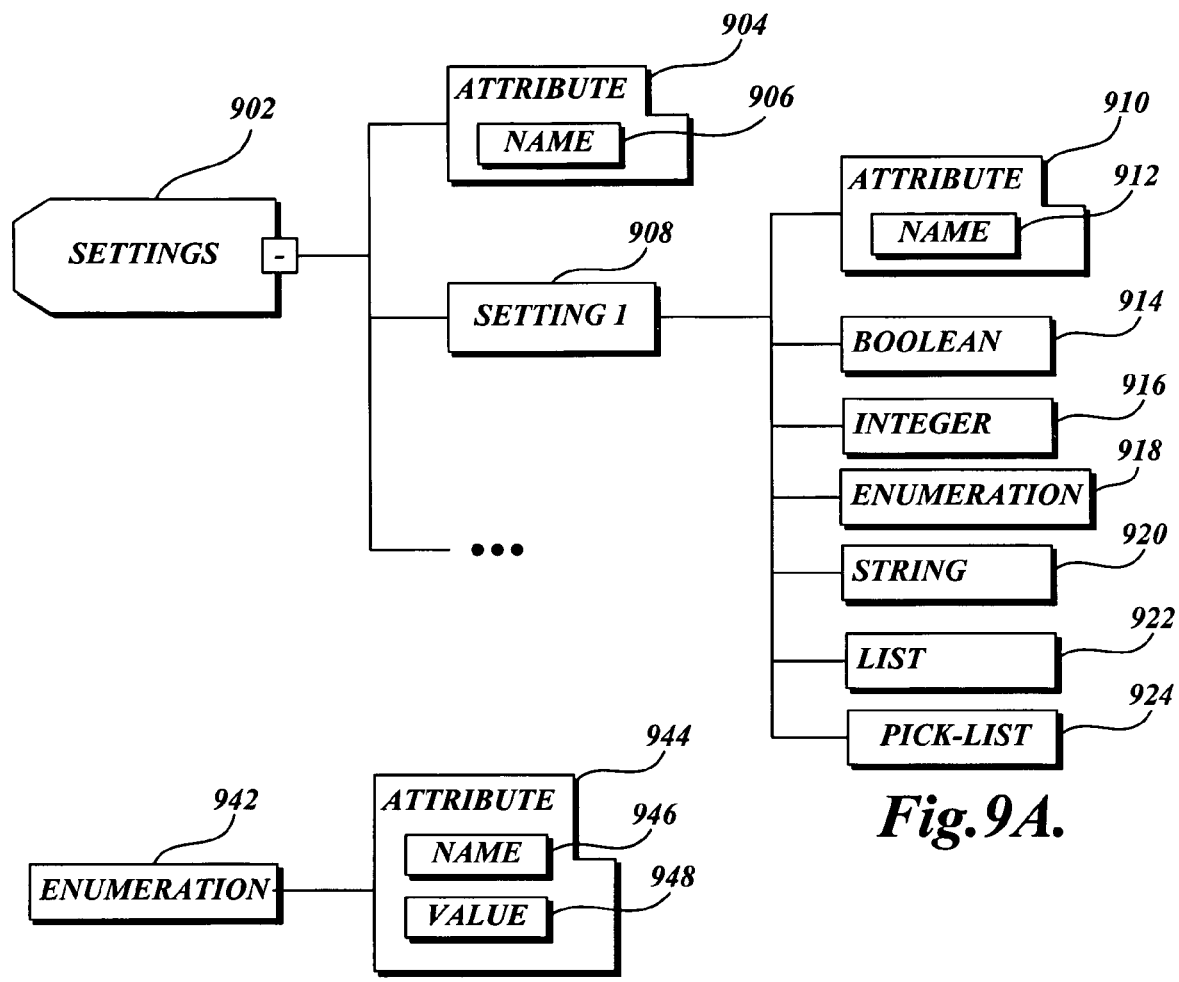
Fig.9A.
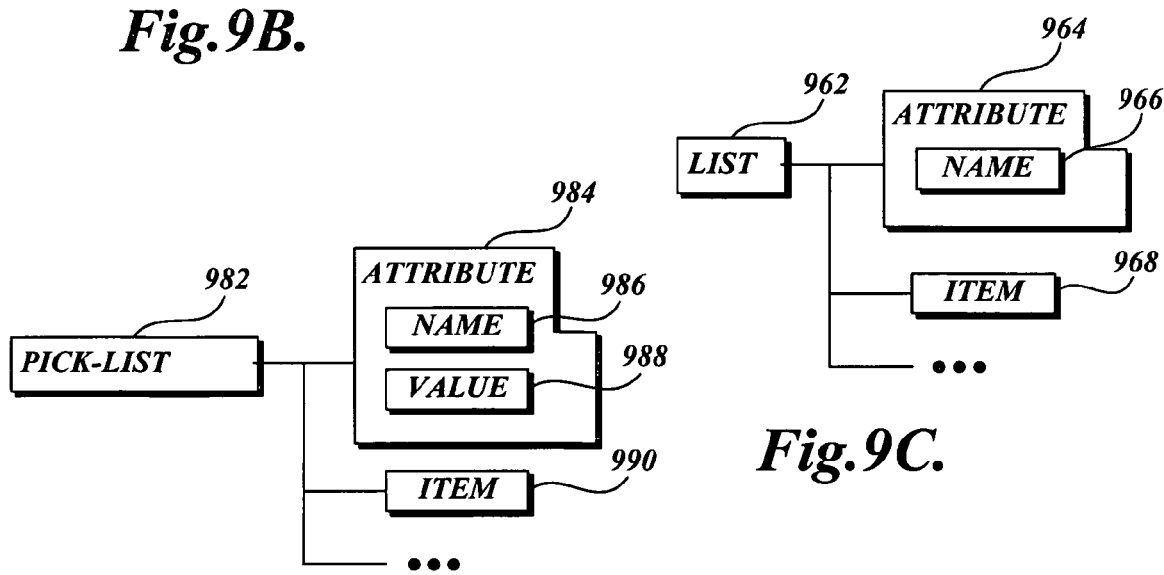
Fig.9B.
Fig.9C.
Fig.9D.

COMMENT PROCESSING

CROSS-REFERENCE TO RELATED APPLICATION

This application claims the benefit of U.S. Provisional Application No. 60/716,295, filed Sep. 12, 2005, entitled EXTENSIBLE XML FORMAT FOR LOCALIZATION DATA, the disclosure of which is hereby expressly incorporated by reference, and the filing date of which is hereby claimed under 35 U.S.C. §119(e).

BACKGROUND

The software market has become increasingly international in recent years. Ubiquitous software application programs ("software applications"), such as word processing, spread sheets, electronic mail, and the like, are now available in different countries. Making software applications available in different countries often necessitates the creation of software applications with corresponding user interfaces and other human-readable text, such as error messages, presented in various local human languages (as opposed to computer languages). The creation of such localized software applications is necessary in order to increase the market share and the market value of such applications. Including local language is of concern primarily in the user interface of software applications, such as command interface, menus, messages, status information, labels, results of computations, and the like. The need for software applications in different local languages is driven by many factors, among which are the increasing number of countries with different languages where computers are increasingly being used as part of daily business and life, the increasing number of non-technical areas using software applications having user interfaces that require natural language interactions, such as office software applications like word processing, as opposed to technical symbol interaction, that is, interaction using accounting or mathematical symbols, and user's demand to interact with software applications in their own local language. The common term of art used to identify the process of creating software applications in different local languages is "localization."

In addition to human-readable text, human-visible graphic components, such as icons, colors, and shapes, and human-audible sounds may also have to be localized to address cultural sensitivities and contexts. For example, in some Asian cultures, red represents good fortune and prosperity while in most western cultures red represents danger or caution. So, if a symbol or background of a dialog box in a graphical user interface ("GUI") is displayed in red, it may have different and confusing connotations for users from different cultures. Therefore, the process of localization goes beyond mere translation of text to a different language and includes the localization of other symbols, colors, and sounds, as well.

The need for localized software applications creates several issues during the development and maintenance of the software applications. The development and maintenance of localized software applications require appropriate development tools and development environments for the processing and localization of various human-readable and human-visible software components. Additionally, localization of software applications may be done by multiple organizations, each comprising multiple departments, and each department performing a different part of the process of localization. One of the major disadvantages of the currently available developmental and organizational environments is the limited extensibility and flexibility of data models used by the development tools and environments. For example, some of the data used by the development tools and environments are in binary format which, makes reading, editing, sharing, and manipulating data difficult at best.

A data format is desired to provide consistency, extensibility, and flexibility across different organizations and development tools. Additionally, standard functional and data interface methods are desirable for accessing and manipulating such data.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Methods, apparatus, and computer-readable media employing computer-readable components for localization of data included in software programs are described. In one exemplary form, the computer-readable components comprise data elements defined by a software data schema and an owned comment data element comprising information about the localization of the data included in the software programs and an associated owner with permission to create, access, and manipulate the owned comment data element. The owned comment data element is included in other data elements. The owned comment data element may also be included in a list of owned comment elements comprising at least one owned comment data element.

Also described are computer-implementable methods of processing owned comment data elements for localization of data included in software programs, comprising accessing the owned comment data elements included in at least one source file including data and instructions; extracting the owned comment data elements from the at least one source file by at least interpreting and executing instructions embedded in the owned comment data elements; and producing at least one output file including the extracted owned comment data elements.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 9A is a pictorial diagram of an exemplary Settings data format;

FIG. 9B is a pictorial diagram of an exemplary Enumeration element;

FIG. 9C is a pictorial diagram of an exemplary List element;

FIG. 9D is a pictorial diagram of an exemplary Pick-List element;

DETAILED DESCRIPTION

A system and a method for defining standard and extensible localization data and an object model for access to and manipulation of such data are described. While the system and method are ideally suited for use in a localization process, the system and method may find use in other software environments where multiple development tools and organizations are involved that share the same underlying data. Thus it is to be understood that the present invention should not be construed as limited in application to the exemplary embodiments described herein, and such exemplary embodiments should not be construed as limiting.

Figure 1:
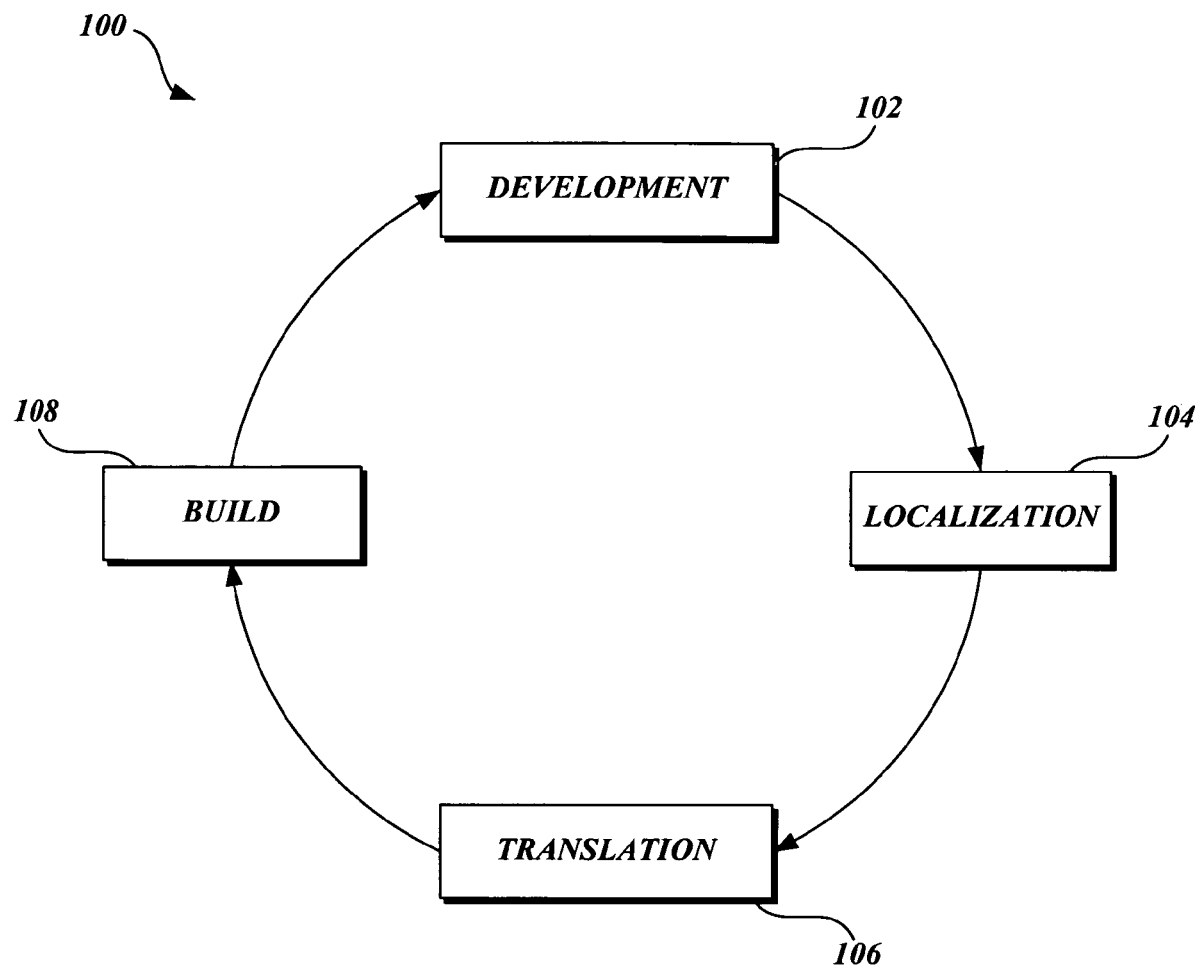
FIG. 1 is a pictorial diagram of an exemplary localization process.

FIG. 1 is a pictorial diagram of an exemplary localization process 100. The exemplary localization process comprises an operating cycle including several distinct stages. The stages include a development stage 102, a localization stage 104, a translation stage 106, and a build stage 108. Those skilled in the art will appreciate that the operating cycle stages may include fewer or more stages than described in this exemplary embodiment. For example, some of the stages may be integrated to create fewer stages or further broken down to create more stages. In the development stage 102, the development engineers of a software application program ("software application") develop the software code and user interface ("UI"). The UI may include text, visual, and audio components. For example, the development engineers write and compile the code for the software application. The code may be written in any of several available programming languages, such as C, C++, C#, and the like, and include source code files, header files, and resource files. The resource files generally contain visual and other UI elements, such as bitmaps. The development engineers may also include comments in some of these files, for example, the resource files. Comments include remarks about the code or UI elements, as well as instructions to software tools, such as various software compilers, administration tools, and build tools used during the development of the localized software applications. The development engineers pass the collection of files, including compiled code and resource files, to the localization stage 104, where localization engineers continue with the localization process. Localization engineers add more comments to the files, which apply to all target languages and cultures. Next, the files are passed to the translation stage 106, where translation is performed on the software application files for each specific language. Finally, the files are passed to a build stage 108, where files are built to produce executable software application files for each of multiple languages.

Figure 2:
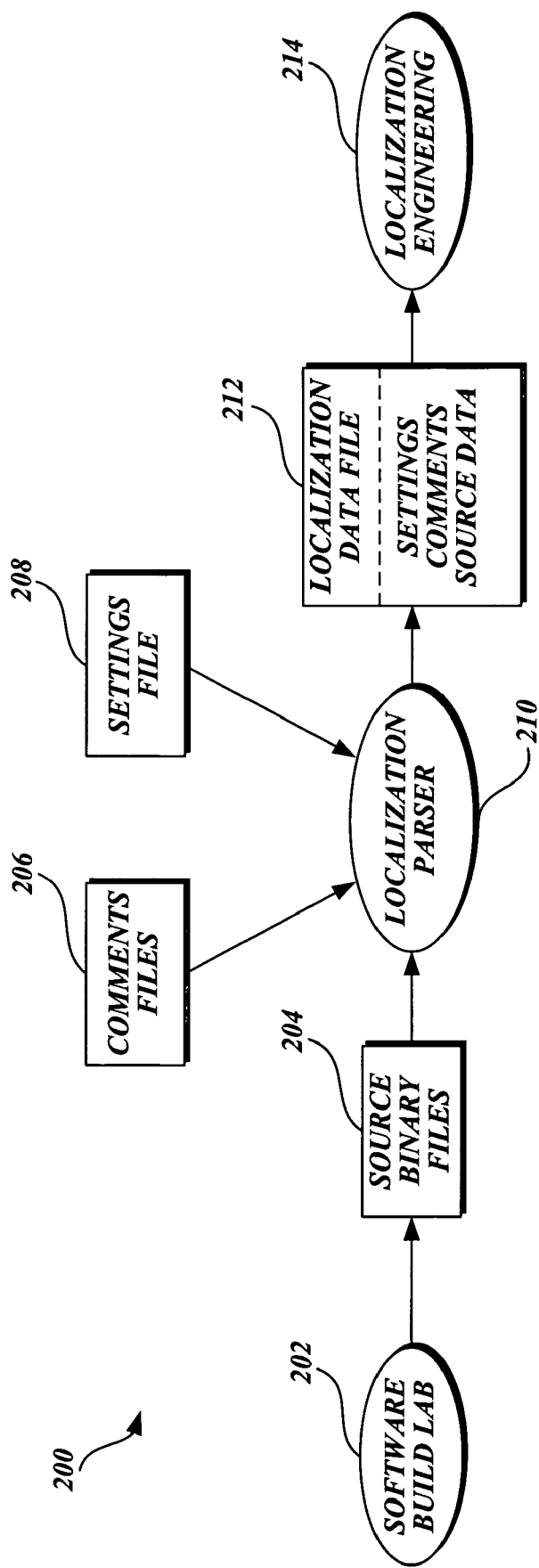
FIG. 2 is a pictorial diagram showing an exemplary localization data flow.

FIG. 2 is a pictorial diagram showing an exemplary localization data flow 200 from the development stage 102 to the localization stage 104. A localization parser tool 210 is used to integrate several files, including source binary files 204, comments files 206, and settings files 208, and produce an output localization data file 212. The source binary files 204 come from development engineers and a software build lab 202. The localization file 212 is a file that is passed onto the localization engineering 214 in the localization stage 104. In one exemplary embodiment, the localization data file 212 comprises the settings from the setting files 208, the comments from the comments files 206, and the source binary data from the source binary files 204. The source binary files 204 provided by the software build lab 202 include the binary data resulting from the build of the software application source files in an original language, such as English.

The comments embedded in the comments files 206, source binary files 204, and settings files 208 are tagged to indicate an owner and a source of the comments. For example, comments originating from development engineers may be tagged with "DEV" to indicate the source of the comments indicated by such tag. Various software tools used in the localization process, such as a comment extractor tool, may add comments to the software applications files as well. For example, a comment extractor tool may tag comments owned by the comment extractor tool with "RCCX." The comment extractor tool may not produce an output file if there are no comments in an input file on which the comment extractor tool operates. Comments are case-sensitive, where lower case and upper case letters define distinct words, or comments are not case-sensitive. Comments may also be enabled or disabled. For example, a localization administration tool may tag comments with "LCI" and may be used to disable other DEV and RCCX comments. A software application build tool owns one or more of certain types of comments identified by a particular tag, such as dev and RCCX, which types the build tool processes. In one exemplary embodiment, the behavior of the tools, such as the software build tool, is controlled by parameters set in a configuration file.

Two different types of files contain and claim ownership of one or more of the same types of comments, as defined by the comment tag. The claim of ownership of the same type of comments by multiple files creates a conflict. The ownership conflict may be resolved, for example, by assigning the ownership to the more recent file, or the conflict may be resolved based on a pre-assigned ownership priority to the files. Thus, the file with the higher priority will have a better claim to the comments of the type subject to ownership conflict. Other types of conflict resolution can also be used. Thus, these examples should be construed as exemplary and not as limiting.

When multiple files containing different types of comments are merged, warning or error messages may be issued if ownership conflicts arise. If during a comment merge operation intentional changes are encountered, information messages are issued indicating so. For example, an information message may be issued when a comment is ignored because a more recent version of a file owning the comment is available. If a comment cannot be disabled, a warning message is generated. Similarly, if a comment that is not owned by a file or a tool is disabled, a warning message is issued. In one exemplary embodiment, ownership of comment types are reassigned from an existing owner to a new owner. For example, the ownership of a DEV type comment is transferred from the parser tool to the build tool. In one exemplary embodiment, each owner has an ownership list of the types of comments that the owner owns. If a new type of comment, not on the ownership list of an owner, is assigned to the owner, the owner retains the ownership and issues a warning message. In one exemplary embodiment, if two files claim ownership of the same comment, an error message is issued. Such ownership conflict may be resolved at a later stage, such as the build stage 108, of the localization process. In one exemplary embodiment, a resource that does not contain a comment type, which the resource file owns, is considered to have an empty and enabled comment and is treated as such during a comment merge operation.

As discussed above, during the localization process, comments are added to the software source code and localization files to provide information and instructions for the subsequent steps in the localization process. The comments help localizers of the software to improve the quality and reduce the cost of localization. The benefits of providing comments include information sharing, aiding in creating of pseudo builds, and verifying translation integrity. In one exemplary embodiment, sharing information includes providing standard localizability instructions about string resources, which reduces bugs produced by the incorrect localization of such string resources. String resources include text messages, such as warnings, presented to a user of the software. Pseudo builds are temporary test builds of software (that is, compilation of software code) used by test teams to find localizability bugs early in the product development cycle, to plan for the testing of the real localized builds, and to decrease the overall localized build cost. Translation integrity is verified by using the localizability instructions and comments. Translation integrity is verified by matching the translations provided by the localizers with a restriction set for localization. The restriction set comprises matching information, such as words and phrases, between an original language of the software and a target language for which the software is being localized.

In one exemplary embodiment, a comment extractor tool is used. As indicated above, a comment extractor tool is a localization tool that is run on files which include comments to extract and write such comments to an output file, such as a localization data file. In another exemplary embodiment, each tool used in the localization process can generate comments and tag such comments to identify the tool as the source of the comments. A tool may generate comments with a source tag that indicates a different source. For example, a comment extractor tool may generate a "DEV" comment. In such a case, a clash may occur between two comments with the same tag but from different sources. In one embodiment, a comment override model is used to disable clashing comments. A disabled comment is ignored during processing.

Figure 3:
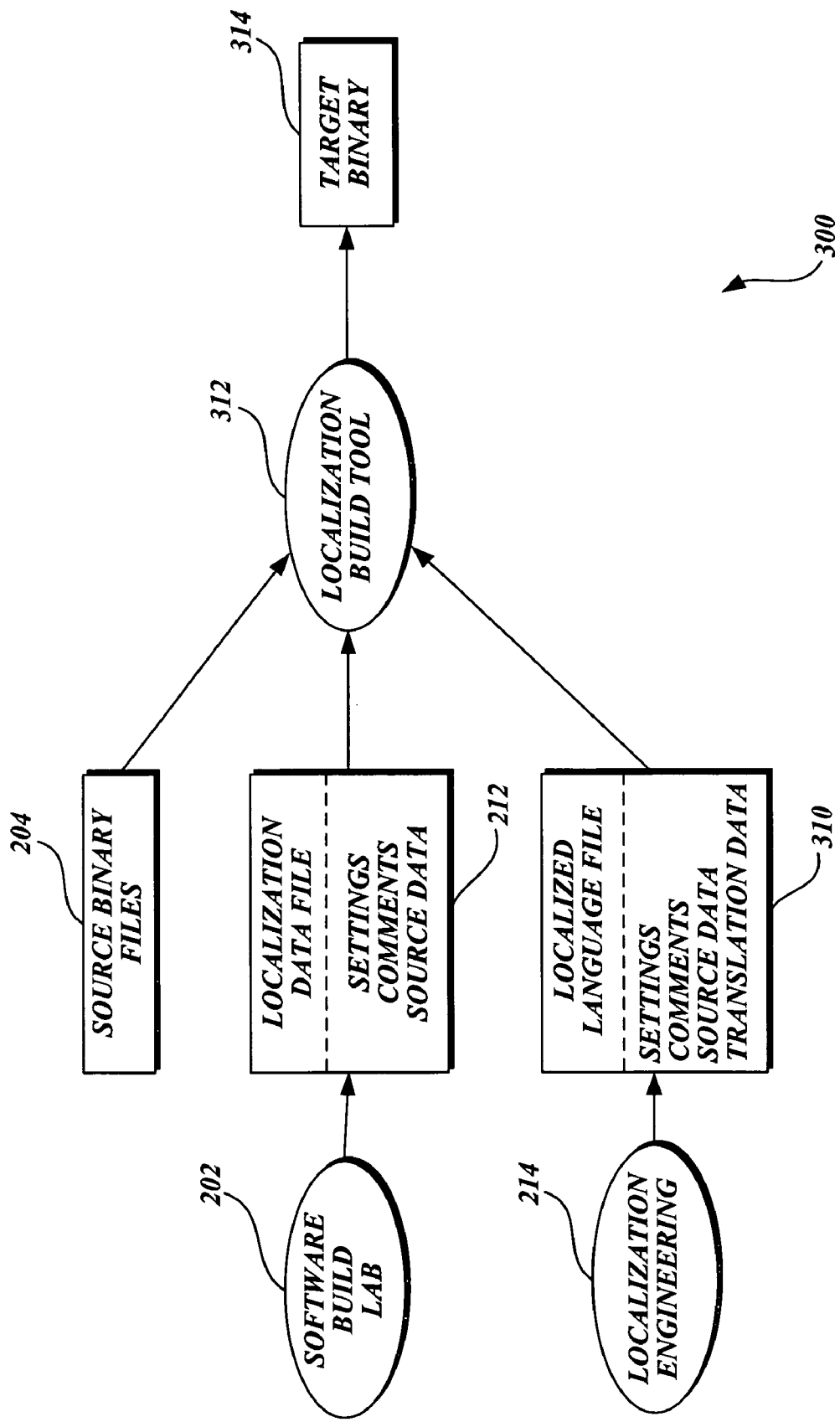
FIG. 3 is a pictorial diagram showing another exemplary localization data flow.

FIG. 3 is a pictorial diagram showing another exemplary localization data flow 300 from localization stage 104 and translation stage 106 to build stage 108. In this example, a localization builder 312 processes the data contained in the source binary file 204, the localization data file 212, and a localized language file 310 to produce an output file target binary 314. As discussed above with respect to FIG. 2, the localization data file 212 includes the settings, comments, and source data integrated from data in other files. The localized language file 310 includes the settings, comments, source data, and translation data added by the localization engineering 214. The localization build tool 312 uses the source binary files 204, the localization data file 212, and the localized language file 310 as input files and produces a target binary file 314 in a target language. Creation of the target binary file 314 is the final localized software application product and the main goal of the localization process.

The tools and processes discussed above depend on a common and consistent data format based on which the tools can integrate and process data in a standardized way. In one exemplary embodiment, a localization extensible markup language ("XML") schema is used for defining the consistent data formats for use by various localization tools and related files discussed above. The localization XML schema provides an extensible XML format that allows different groups and organizations to develop software tools to handle specific tasks. The localization XML schema also allows the development of tools and data that are shareable by multiple organizations, thereby enabling cross group-collaboration. For example, the localization parser tool 210, the localization build tool 312, and a localization administration tool can use and share the same data formats for different files throughout the localization process. In one exemplary embodiment, the Localization XML schema may also be extensible. The extensibility of the Localization XML schema allows other parties to develop new tools with new features without changing the data format.

Figure 4:
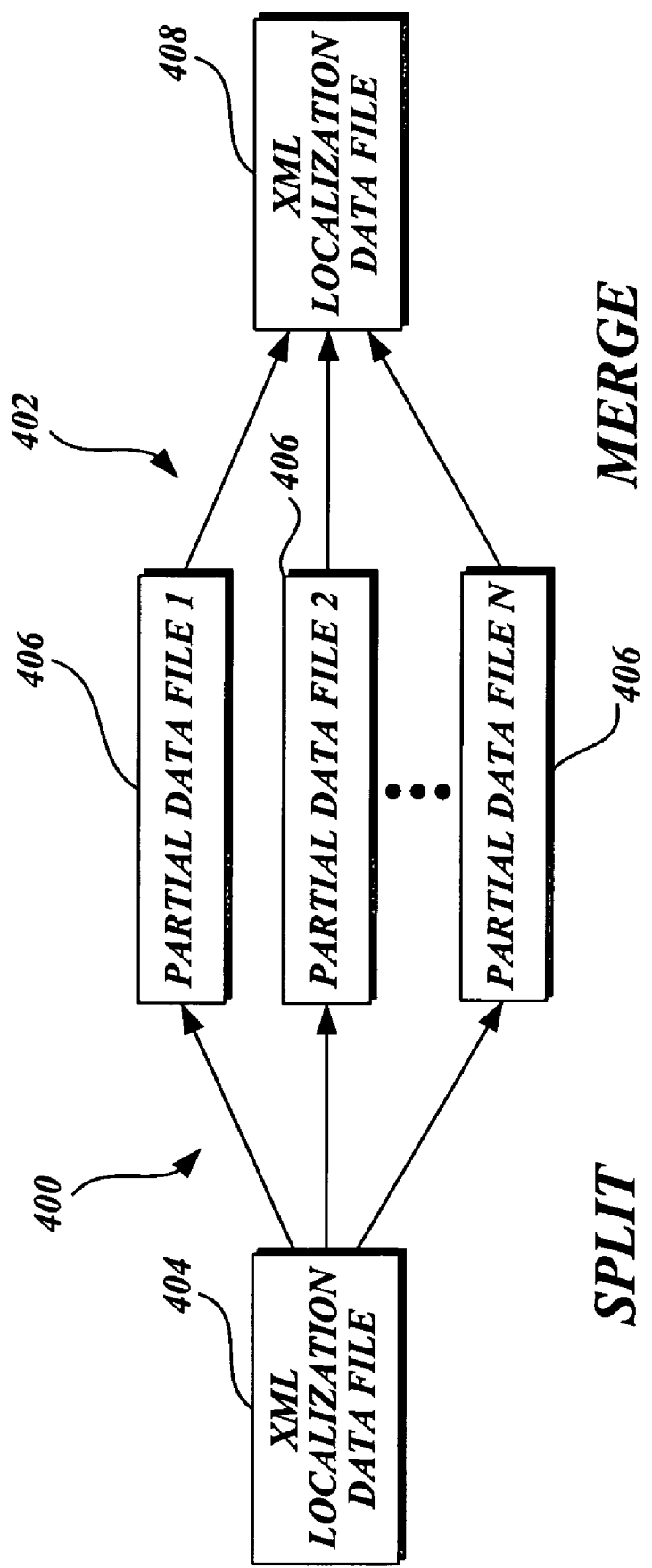
FIG. 4 is a pictorial diagram showing exemplary file Split and Merge operations on an XML data file.

FIG. 4 is a pictorial diagram showing exemplary file Split and Merge operations 400 and 402 (different from a comment merge operation), respectively, on a Localization XML data file 404 based on the extensible Localization XML schema. In this exemplary embodiment, the Localization XML data file 404 is split into multiple partial data files 406 using the file Split operation 400. The partial data files 406 may be used in parallel by multiple organizations, or by a parallel processing software tool processing each partial data file 406 independently of the other partial data files 406. For example, each one of multiple third parties developing data files for multiple software tools, respectively, may use one partial data file that is relevant to a software tool being developed by each one of the multiple third parties. As another example, multiple organizations translating the same software application into multiple languages may use the appropriate partial data file 406, created by the file Split operation 400, to create the translated version of the software application resources. When the multiple organizations complete the processing of the partial data files 406, the partial data files 406 are merged into a single Localization XML data file 408 using the file Merge operation 402.

Figure 5A:
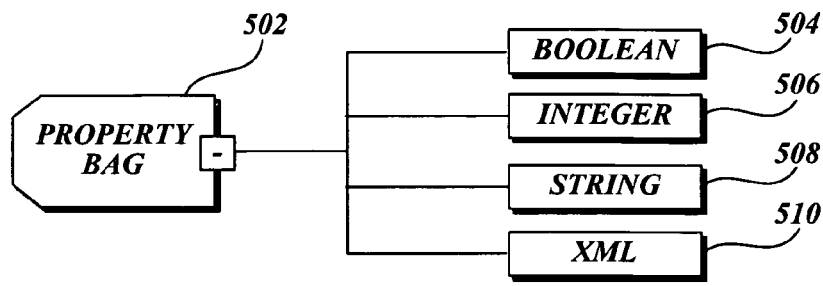
FIG. 5A is a pictorial diagram of an exemplary Property Bag.

The localization XML data file 404 includes XML elements that specify localization information. One of the elements included in the localization XML data file 404 is a Property Bag. FIGS. 5A-5E illustrate exemplary embodiments of a Property Bag and corresponding XML elements. FIG. 5A is a pictorial diagram of an exemplary Property Bag data structure 500. A Property Bag 502 is a data container for storing any number of properties. In one exemplary embodiment, each complex data type is associated with at least one property bag. A complex data type is a data type that contains other data types. For example, an XML element that contains other XML elements is a complex data type. In one exemplary embodiment, a unique name, defined using a "Name" attribute, and a value are assigned to the property. The value must be of a data type supported by the localization XML schema. Each complex data type defined in the localization XML schema includes a Property Bag element to store any amount of data required by the consumer of the localization XML schema. The exemplary Property Bag 502 illustrated in FIG. 5A includes a Boolean data type 504, an integer data type 506, a string data type 508, and an XML data type 510.

Figure 5B:
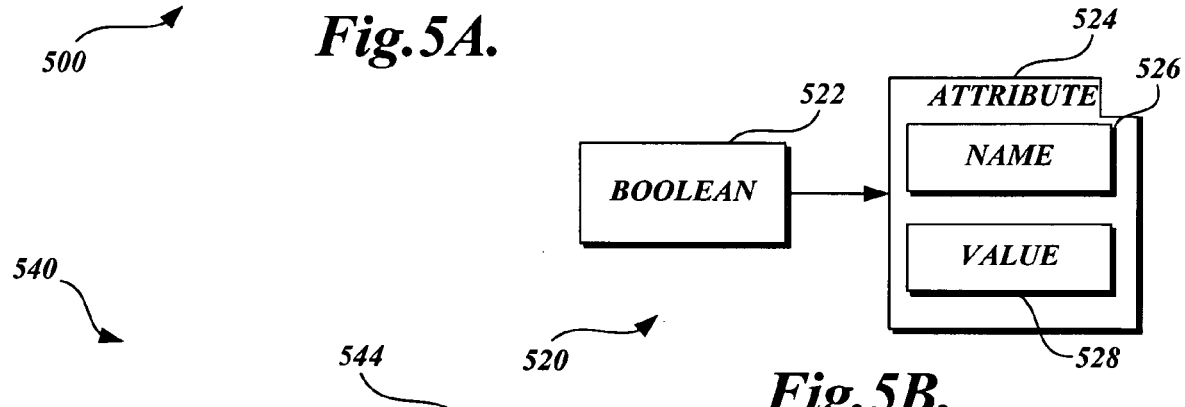
FIG. 5B is a pictorial diagram of an exemplary Boolean XML element.

FIG. 5B is a pictorial diagram of an exemplary Boolean XML element 522. The Boolean XML element 522 includes an attribute list 524. Attributes of a data type in XML are used to represent information about the data type, such as name and value of the data type. One of the attributes included in the attribute list 524 is Name 526. In one exemplary embodiment, the Name attribute 526 is an alpha-numeric string. Value 528 is another attribute of the Boolean XML element 522. Value 528 represents a logical value of the Boolean XML element 522. The logical values include two logical state values of TRUE and FALSE, as known in the art.

Figure 5C:
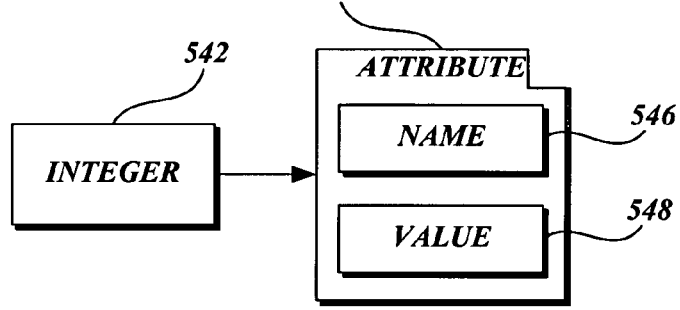
FIG. 5C is a pictorial diagram of an exemplary Integer XML element.

FIG. 5C is a pictorial diagram of an exemplary Integer XML element 542. The Integer XML element 542 includes an attribute list 544. One of the attributes included in the attribute list 544 is Name 546. In one exemplary embodiment, the Name attribute 546 is an alpha-numeric string. Value 548 is another attribute of the Integer XML element 542. Value 548 represents an integer value of the Integer XML element 542.

Figure 5D:
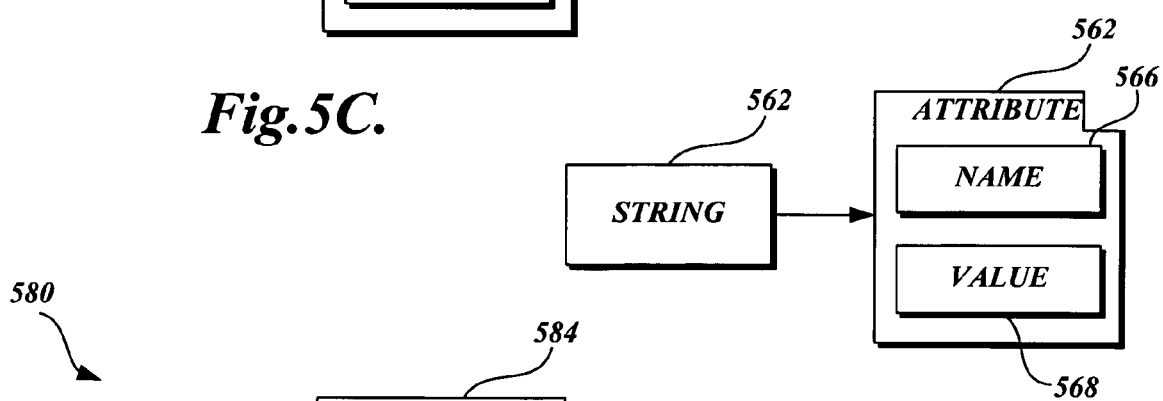
FIG. 5D is a pictorial diagram of an exemplary String XML element.

FIG. 5D is a pictorial diagram of an exemplary String XML element 562. The String XML element 562 includes an attribute list 564. One of the attributes included in the attribute list 564 is Name 566. In one exemplary embodiment, the Name attribute 566 is an alpha-numeric string. Value 568 is another attribute of the String XML element 562. Value 568 includes a string of characters, including alpha-numeric as well as other characters, represented by the String XML element 562.

Figure 5E:
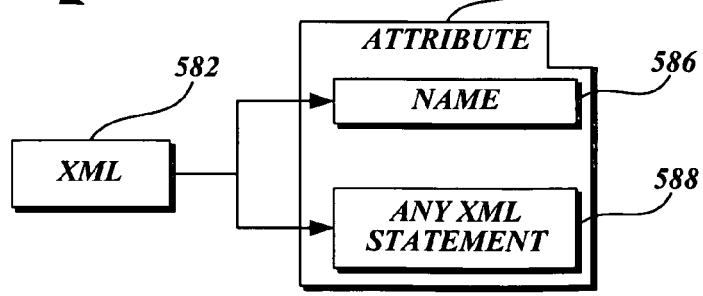
FIG. 5E is a pictorial diagram of an exemplary XML-string XML element.

FIG. 5E is a pictorial diagram of an exemplary XML-string XML element 582. An XML-String XML element 582 represents any valid XML statement. The XML element 582 includes an attribute list 584. The attribute list 584 includes a Name attribute 586. In one exemplary embodiment, the Name attribute 586 is an alpha-numeric string. The attribute list 584 also includes an Any XML Statement attribute 588, comprising any valid XML statement.

Those skilled in the art will appreciate that other variations of Property Bag element 502 are possible. For example, Property Bag element 502 may include a type of data element, such as "Any" element (not shown in the above figures), wherein the Any element includes a name attribute, a type attribute, and a value attribute. In such exemplary embodiment, the type attribute specifies how the value attribute should be interpreted. For instance, type may equal "Unsigned_Integer" and value may equal "15."

Figure 6:
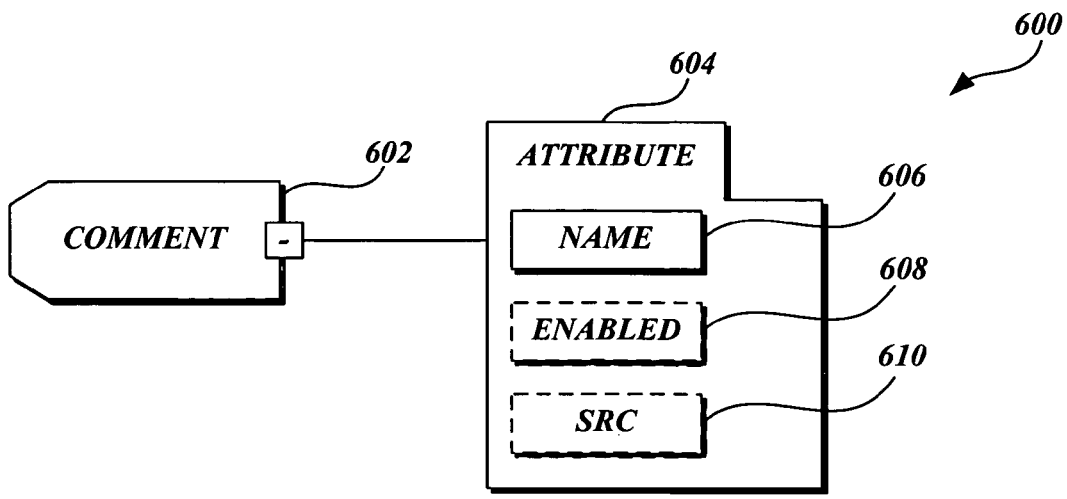
FIG. 6 is a pictorial diagram of an exemplary Comment data format with a source attribute.

FIG. 6 is a pictorial diagram of an exemplary Comment data format 600 with a source attribute. In one exemplary embodiment, a Comment element 602 includes natural language text providing information about the localization process for human operators, as well as pre-defined text strings provided as instructions to human operators and software tools that process comment files 206 and localization XML data files 408. The comment element 602 illustrated in FIG. 6 includes an attribute list 604. In one exemplary embodiment, the attribute list 604 comprises a Name attribute 606, an Enabled attribute 608, and an SRC (for "source") attribute 610. The Name attribute 606 is used to reference the comment by name. The Enabled attribute 608 works as an indicator to indicate whether comment 602 is enabled or disabled. The SRC attribute 610 indicates the source of the comment, that is, the SRC attribute 610 is a tag for identifying the owner and source of a comment. As discussed above with respect to FIG. 2, different types of comments are owned by different owners. A comment owner may include instructions and other information about the localization process that relate to the comment owner's area of responsibility. For example, a software developer may provide general information and instructions in the form of comments. The comments made by a particular owner are tagged to identify the owner of the comment. In one exemplary embodiment, the comments made by each owner may only be manipulated by the owner to whom the comments belong. In another exemplary embodiment, the ownership of a comment may be transferred from one owner to another. For example, a comment labeled "DEV" (i.e., developer, as discussed above) may be allowed to be owned by the comment extractor tool, which normally only owns comments tagged as "RCCX." In an exemplary embodiment, comment names and comments may be case-insensitive. Comments may also be enabled and disabled. As discussed above, a disabled comment is ignored during processing.

Figure 7:
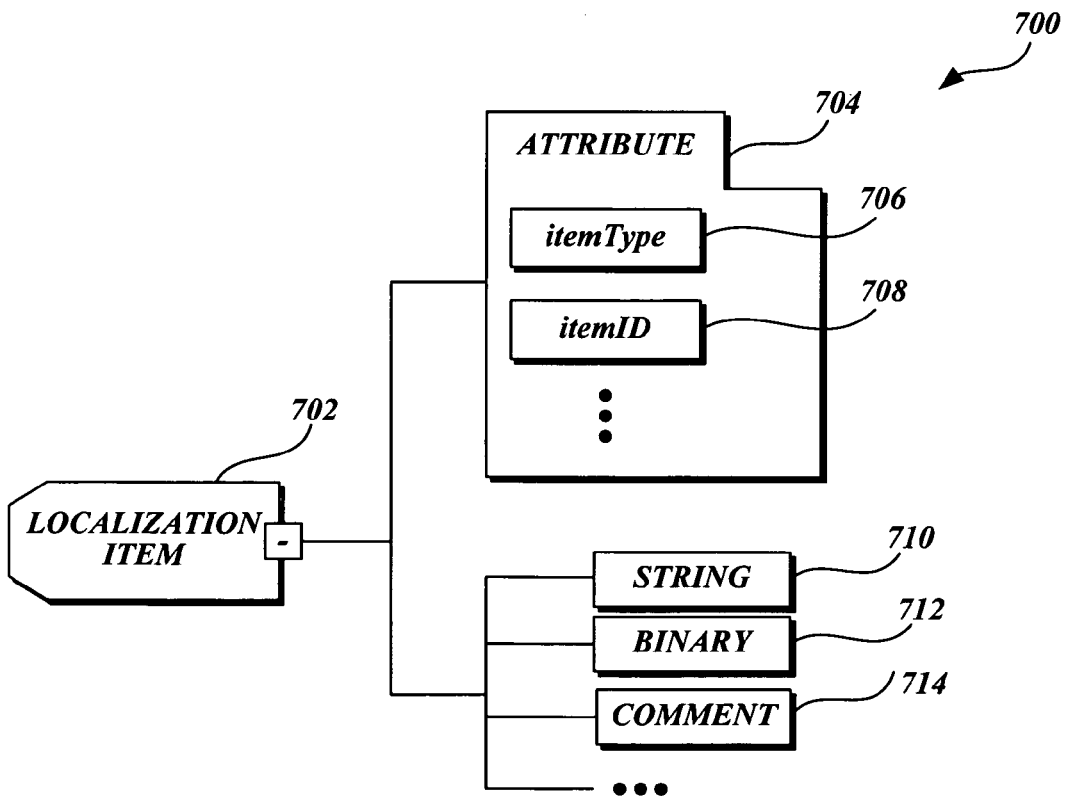
FIG. 7 is a block diagram of an exemplary Localization Item data format with comments.

FIG. 7 is a block diagram of an exemplary Localization Item data format 700 with comments. In one exemplary embodiment, a localization item 702 includes attributes 704. Attributes 704 comprise itemType 706 and itemID 708. Localization item 702 further includes a string element 710, a binary element 712, and comments 714. A localization item 702 is any part or resource in the software being localized, that may be translated or otherwise adapted to a local culture and language. For example, a text message or an icon is a localization item 702. ItemType 706 is an attribute that designates the type of the localization item 702. For example, itemType 706 may indicate that a particular localization item 702 is a text message or a color. ItemID 708 is used as an identifier for the localization item 702. The localization item 702 may optionally include a string 710, binary data 712, and comments 714, depending on the itemType 706. For example, if itemType 706 indicates that the localization item 702 is a text string, the localization item 702 may include another element, such as a property element (not shown in the figure), specifying a default font to be used in the localization. In one exemplary embodiment, several types of the string 710 and binary data 712 are included in the localization item 702. For example, string and binary data for a source language, a target language, and other reference languages may be included in the localization item 702. A reference language may be used to provide additional information for the translation of localization item 702 from the source language to the target language. In one exemplary embodiment, a parent localization item 702 includes zero or more other child localization items 702 (not shown) collectively constituting a hierarchical structure of localization items 702. The child localization items 702 are included in the parent localization item 702 by means of pointers or equivalent software techniques.

Figure 8:
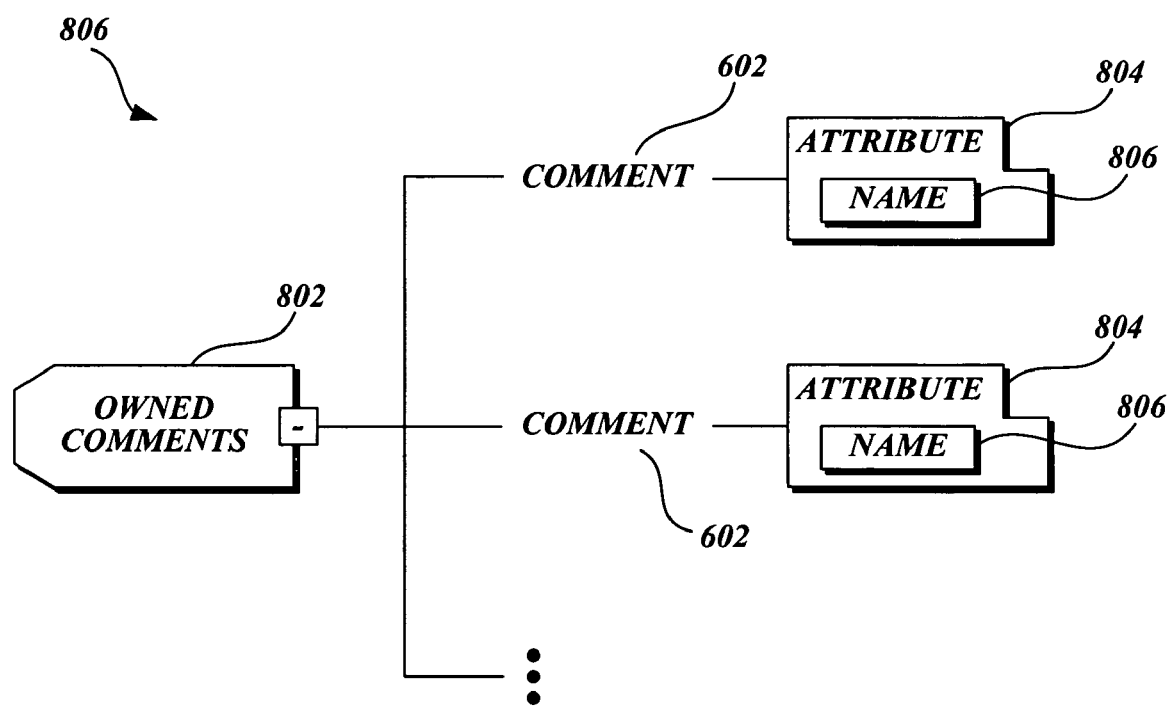
FIG. 8 is a pictorial diagram of an exemplary Owned Comments data format.

FIG. 8 is a pictorial diagram of an exemplary Owned Comments data format 806. The illustrated exemplary owned comments element 802 includes a plurality of comment elements 602, each comprising an attribute 804. The attribute 804 includes a name attribute 806.

FIGS. 9A-9D illustrate exemplary embodiments of a Settings element 902 and corresponding XML elements. FIG. 9A is a pictorial diagram of an exemplary Settings data format. Settings element 902 includes an attribute 904 comprising a name 906. Settings element 902 further comprises a plurality of setting 908 items. Exemplary Setting 1 comprises an attribute 910. Attribute 910 includes the name 912 of Setting 1. Exemplary Setting 1 further includes a Boolean element 914, an Integer element 916, an Enumeration element 918, a String element 920, a list element 922, and a Pick-List element 924. Each of the elements of the setting 908 are further discussed below. The Settings element 902 specifies the current settings of a localization data file.

FIG. 9B is a pictorial diagram of an exemplary Enumeration element 942. The exemplary Enumeration element 942 includes an attribute 944 comprising a name 946 and a value 948. The name attribute 946 identifies the enumeration element 942 by name. The value attribute 948 includes the value of the enumeration represented by the enumeration 942.

FIG. 9C is a pictorial diagram of an exemplary List element 962. The exemplary List element 962 includes an attribute 964 comprising a name 966 and a plurality of item elements 968. The name attribute 966 identifies the list element 962 by name. The item elements 968 each represents one entry of the list 962 and may include many attributes (not shown in this figure), such as an item identifier, a sequence number, a source file name, and the like. Additionally, an item 968 may include other elements (not shown in this figure), such as a string element, a binary element, a comments element, and the like.

FIG. 9D is a pictorial diagram of an exemplary Pick-List element 982. The exemplary Pick-List element 982 includes an attribute 984 comprising a name 986 and value attribute 988. The exemplary Pick-list element 982 further includes a plurality of item elements 990. The name attribute 986 identifies the Pick-List element 982 by name. The item elements 990 each represent one entry of the Pick-List 982 and may include many attributes (not shown in this figure), such as an item identifier, a sequence number, a source file name, and the like. Additionally, an item 990 may include other elements (not shown in this figure), such as a string element, a binary element, a comments element, and the like.

Those skilled in the art will appreciate that other variations of data elements are possible. For example, a data element may include a type of data element, such as "Any" element (not shown in the above figures), wherein the Any element includes a name attribute, a type attribute, and a value attribute. In such exemplary embodiment, the type attribute specifies how the value attribute should be interpreted. For instance, type may equal "Unsigned_Integer" and value may equal "15."

Figure 10:
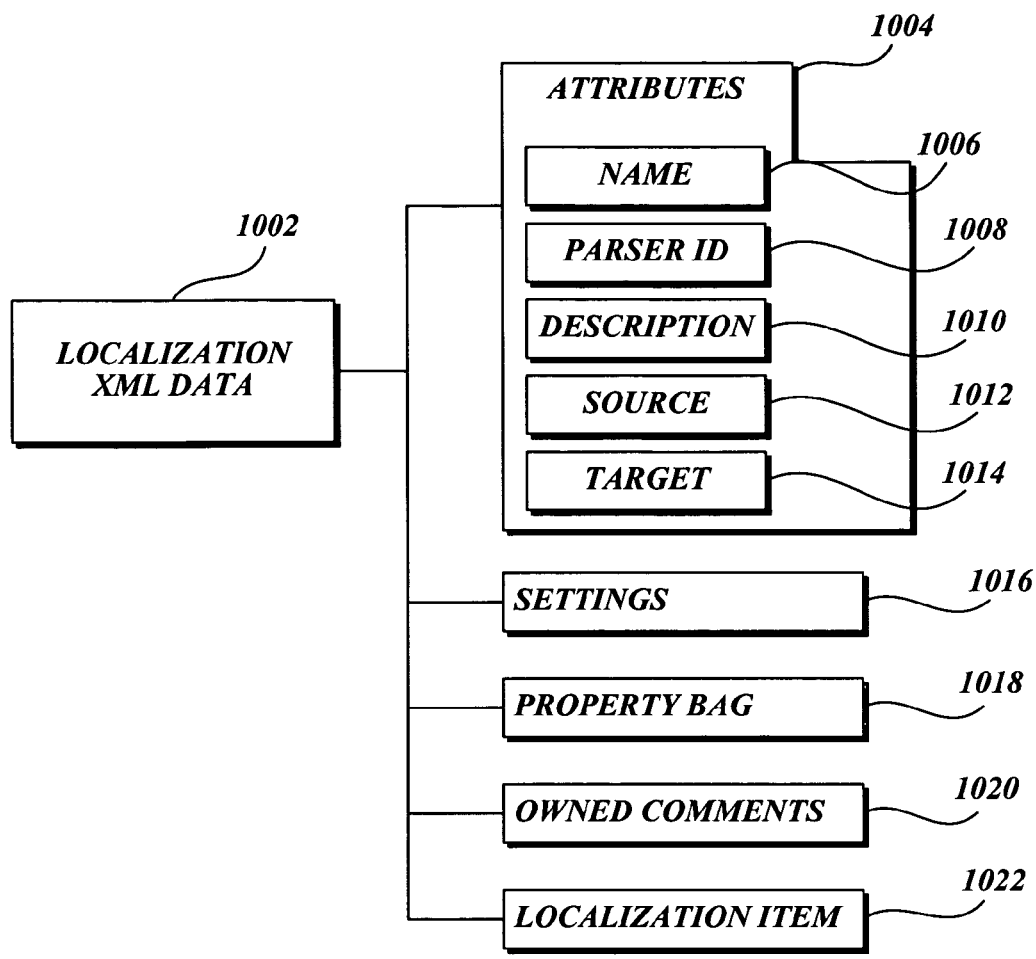
FIG. 10 is a pictorial diagram of an exemplary Localization XML data format.

FIG. 10 is a pictorial diagram of an exemplary Localization XML data format 1002. The localization XML data format is used to define the overall format of the localization data used in the localization process. The exemplary localization XML data element 1002 includes attributes 1004 and optional elements, such as Settings 1016, Property Bag 1018, Owned Comments 1020, and Localization Item 1022, discussed above. The attributes 1004 include a name attribute 1006 and other optional attributes Parser ID 1010, Description 1012, Source 1012, and Target 1014. As discussed above with respect to FIG. 7, the localization item 1022 may include zero or more other child localization items 1022 (not shown) collectively constituting a hierarchical structure of localization items 702.

Figure 11A:
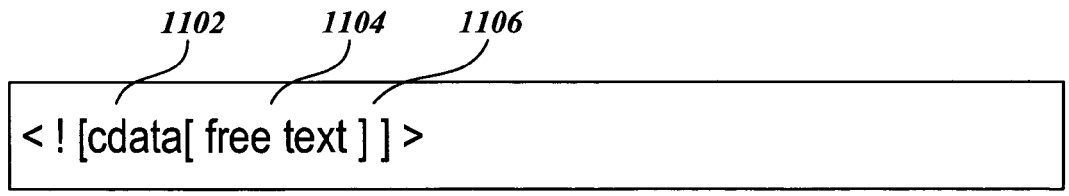
FIG. 11A is an exemplary pictorial diagram of text data contained in a CDATA XML element.
Figure 11B:
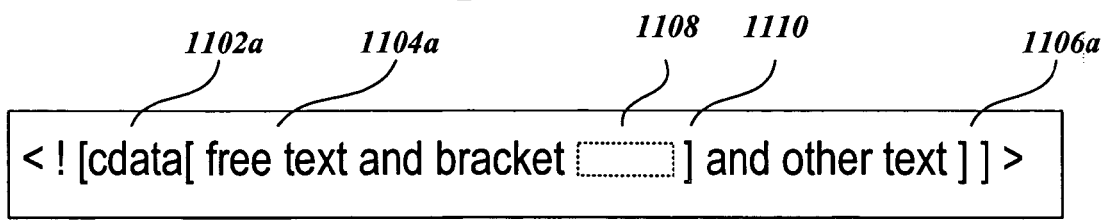
FIG. 11B is an exemplary pictorial diagram of text data including a bracket character contained in a CDATA XML element.

FIG. 11A is an exemplary pictorial diagram of text data contained in a CDATA XML element 1102. The CDATA XML element 1102 is used to represent free text 1104 in localization data files, similar to a string, well-known in the art. The free text 1104 included in the CDATA XML element 1102 is delimited using closing double brackets 1106 immediately after the end of the last free text 1104 character. That is, the closing double brackets 1106 are inserted at the end of the free text 1104 without any white space characters, such as blank, tab, and the like, between the last character of the free text 1104 and the closing double brackets 1106. FIG. 11B is an exemplary pictorial diagram of text data including a square bracket character 1110 contained in a CDATA XML element 1102a. If the free text 1104a includes a square bracket "]" character 1110, the extent of the free text 1104a cannot be determined unambiguously. When a character's meaning is ambiguous, that is, when the character can be interpreted in several ways, an escape character may be used to restrict the interpretation of the character. An escape character may be used in addition to other techniques to disambiguate the character. In one exemplary embodiment, disambiguation of the square bracket "]" includes inserting a white space character 1108, such as a space or a tab character, before the square bracket character 1110 to identify the square bracket 1110 as part of the free text 1104a and not part of the closing double brackets 1106a. In other exemplary embodiments other special characters may be used similarly.

Figure 12:
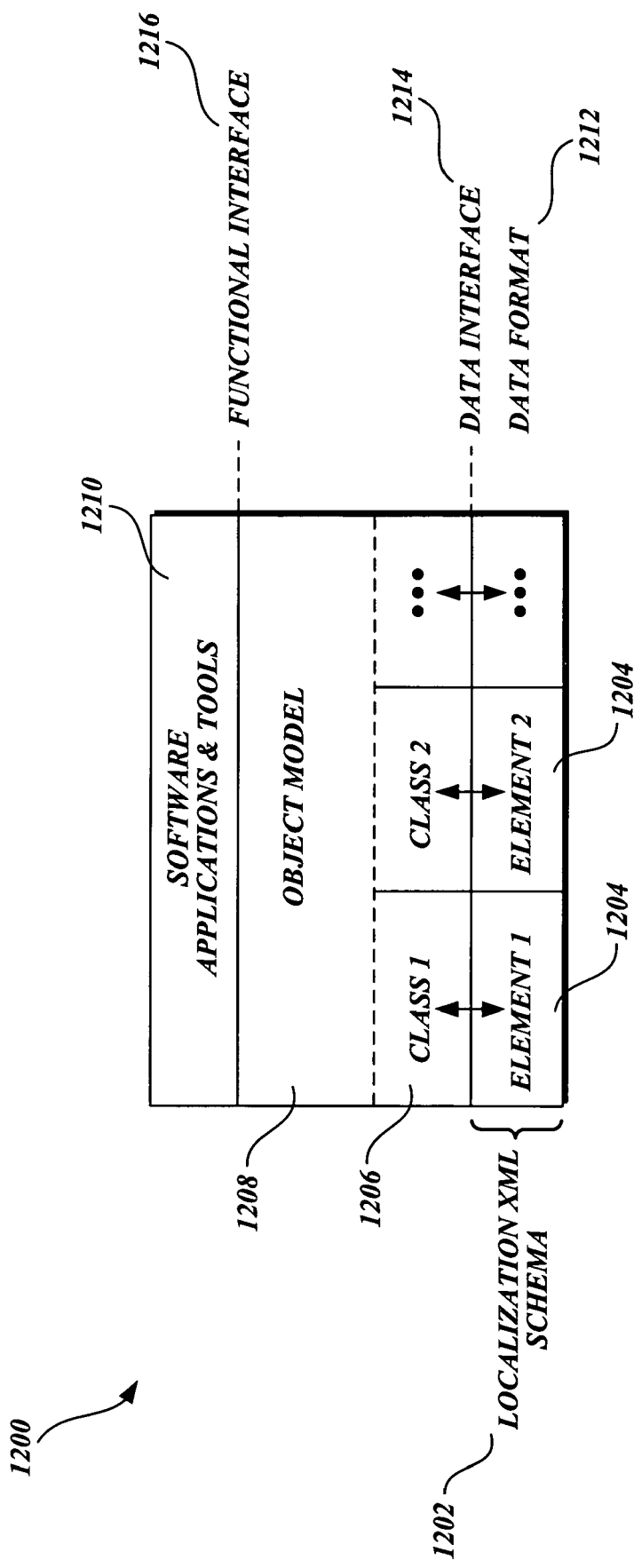
FIG. 12 is a block diagram of an exemplary relationship of a Localization schema and a corresponding object model.

FIG. 12 is a block diagram of an exemplary relationship 1200 of a Localization XML schema 1202 and a corresponding object model 1208. The object model 1208 comprises a number of classes 1206, each class 1206 specifying the design of a software object in the object model. As those skilled in the art will appreciate, classes are abstract objects that are used to define software objects in object-oriented computer languages such as C++ (C-plus-plus), C# (C-Sharp), and Java. Furthermore, those skilled in the art will recognize that a software object is created in a computer memory by instantiating a class, that is, by allocating memory to create a physical object in memory based on the format specified by the corresponding class. The object model 1208 defines one class 1206 substantially for each element 1204 in the localization XML schema 1202. Using the object model 1208, the localization XML schema is implemented in software applications and tools 1210. As discussed above, the elements 1204 define a localization data format 1212. A data interface 1214 for specifying data formats of the localization data as originally defined by the elements 1204 is specified by the classes 1206 in the object model 1208. The software applications and tools 1210 use the data interface 1214 to correctly access and manipulate localization data using the correct formats for each piece of data. The software applications and tools 1210 also use the functional interface 1216 to access and manipulate the localization data to configure and perform localization tasks.

Figure 13A:
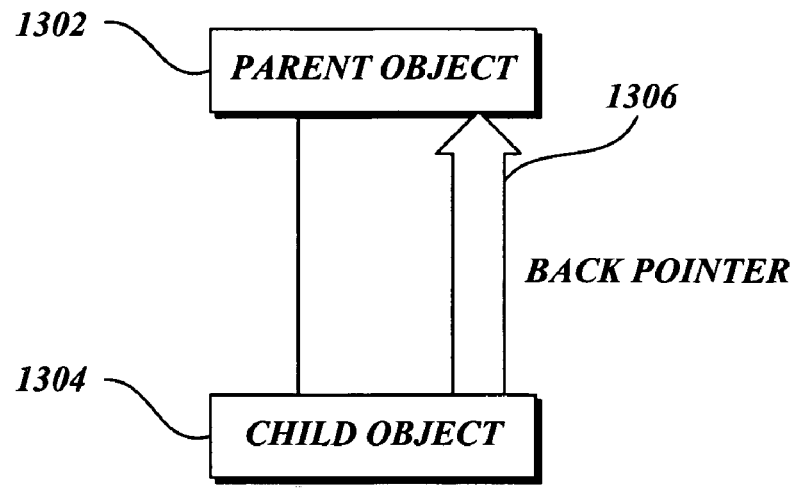
FIG. 13A is a block diagram of an exemplary parent and child objects with back pointer.

FIG. 13A is a block diagram of an exemplary parent and child objects with back pointer. The parent object 1302 is a software object instantiated from a first class. The child object 1304 is a software object instantiated from a second class that was derived from the first class at the time of design of the first and second classes. Those skilled in the art will recognize that in object-oriented computer languages, such as C++, C#, and Java, a second class may be derived (i.e., specified from) from the first class. The second class is said to inherit the members included in the first class. The members of a class include functions, variables, pointers, and other classes. The second class may define additional new members not defined in the first class. The relationship of gaining the members of the first class by the second class is known in the art as inheritance. Inheritance is a process that generally takes place at design time, as contrasted with run-time (i.e., during the execution of the software), during the development of the software. Another property of object-oriented languages that is well-known by those skilled in the art is known as containment, also known as aggregation. When a first class is a member of a second class, the first class is said to be contained in the second class. Containment is a relationship between objects that is different from inheritance. Containment relationship between two objects may be created or destroyed at run-time by reassignment of pointers. It is customary in the art to use the term "parent" to represent the first class, and the term "child" to represent the second class in both the inheritance and containment relationships. Accordingly, the parent/child terminology will be used in the discussions that follow. In the example illustrated in FIG. 13A, the child object 1304 in the object model 1208 (FIG. 12) includes a back pointer 1306 pointing to the corresponding parent object 1302. The back pointer 1306 increases system performance by providing a direct link between the parent object 1302 and the child object 1304, whereby object relationships are traversed in the object model 1208. All objects maintain a reference to their respective parent objects using a back pointer 1306. The back pointer 1306 is set by the parent object 1302 when a relationship is established between a parent object 1302 and a child object 1304. When the relationship between the parent object 1302 and the child object 1304 is discontinued, the child object 1302 is set to point to another parent object.

Figure 13B:
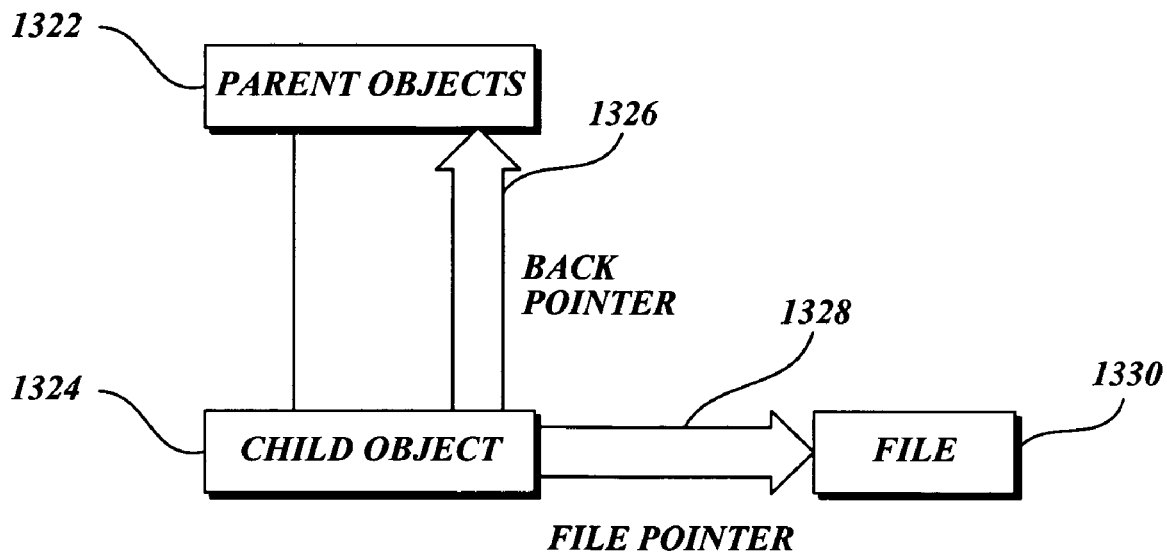
FIG. 13B is a block diagram of exemplary parent and child objects with back pointer and file pointer.

FIG. 13B is a block diagram of exemplary parent and child objects with back pointer and file pointer. As discussed above, the parent object 1322 sets a back pointer 1326 when a relationship is established between the parent object 1322 and a child object 1324. When the relationship between the parent object 1322 and the child object 1324 is discontinued, the child object 1322 is set to point to another parent object. When the child object 1324 is a resource object, a file pointer 1328 is used by the child object 1324 to point to the resource file. A resource, as is known to those skilled in the art, is generally a graphical data object representing a graphical component, such as an icon, a menu, or a bitmap. Resource data are contained in a resource file 1330, which is created from scripted resource specifications using a resource compiler.

Figure 14:
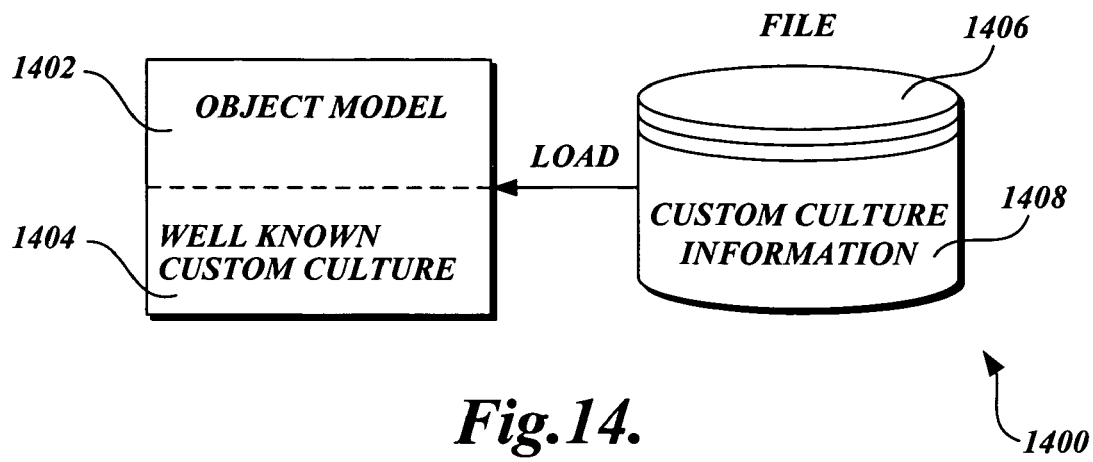
FIG. 14 is a pictorial diagram of exemplary object model with external custom culture information.

FIG. 14 is a pictorial diagram of an exemplary object model 1402 with external custom culture information. The object model 1402 includes well-known custom cultures 1404 by default. For localization to languages and cultures not included in the object model 1402 by default, the object model 1402 is augmented with the custom culture information 1408 from an external file 1406. In one exemplary embodiment, the external file 1406 is present on the local system. In another exemplary embodiment, the external file 1406 is located on a remote system. In one exemplary embodiment, custom culture information 1406 is updated manually. In another exemplary embodiment, custom culture information 1406 may be written to the file 1406 by localization application software.

Figure 15:
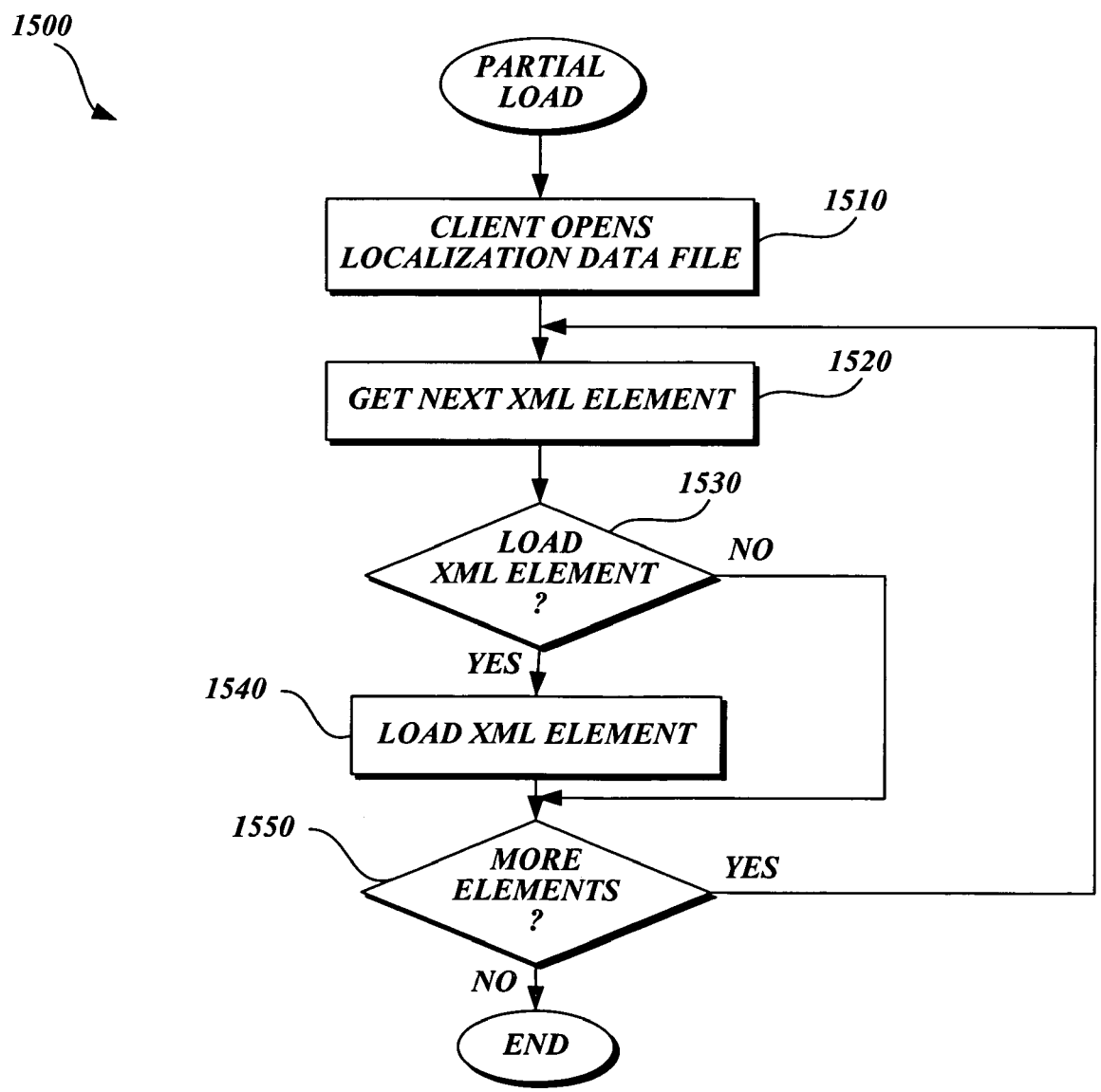
FIG. 15 is a functional flow diagram of an exemplary method of partial loading of data.

FIG. 15 is a functional flow diagram of an exemplary method 1500 of partial loading of data. In block 1510, a client software application opens a localization data file. As discussed above, the localization data file includes localization data used in the process of localization by software application tools, also known as client software applications. In one embodiment, the localization data file comprises XML elements. Those skilled in the art will appreciate that other methods and formats may be used to represent data for software applications, and therefore, the discussions herein about the exemplary XML elements are to be construed as exemplary, not limiting. The client software application has internal logic for determining which XML elements to load into memory for processing. For example, a client software application that only processes text information for localization only needs to load text related information, such as font and size of text characters. At block 1520, the next XML element is obtained from the localization data file for loading into memory and processing. Next, at block 1530, the client software application determines whether the current XML element must be loaded. If the current XML element is selected to be loaded, then in block 1540 the current XML element is loaded and the method 1500 proceeds to block 1550. If the current XML element is not selected to be loaded, method 1500 proceeds to block 1550 where the method 1500 determines whether more XML elements are available in the localization data file. If more XML elements are available in the localization data file, method 1500 proceeds back to block 1520 to get the next XML element. If more XML elements are not available in the localization file, the method 1500 terminates. In one exemplary embodiment, the client software application selects a general type of data to be loaded and other general types of data not to be loaded. For example, a client that processes text sets a flag for loading only string data and not any binary data. In such a case, the selection of data is done at a gross level, differentiating data types for loading based on the general types of the data being selected.

Figure 16:
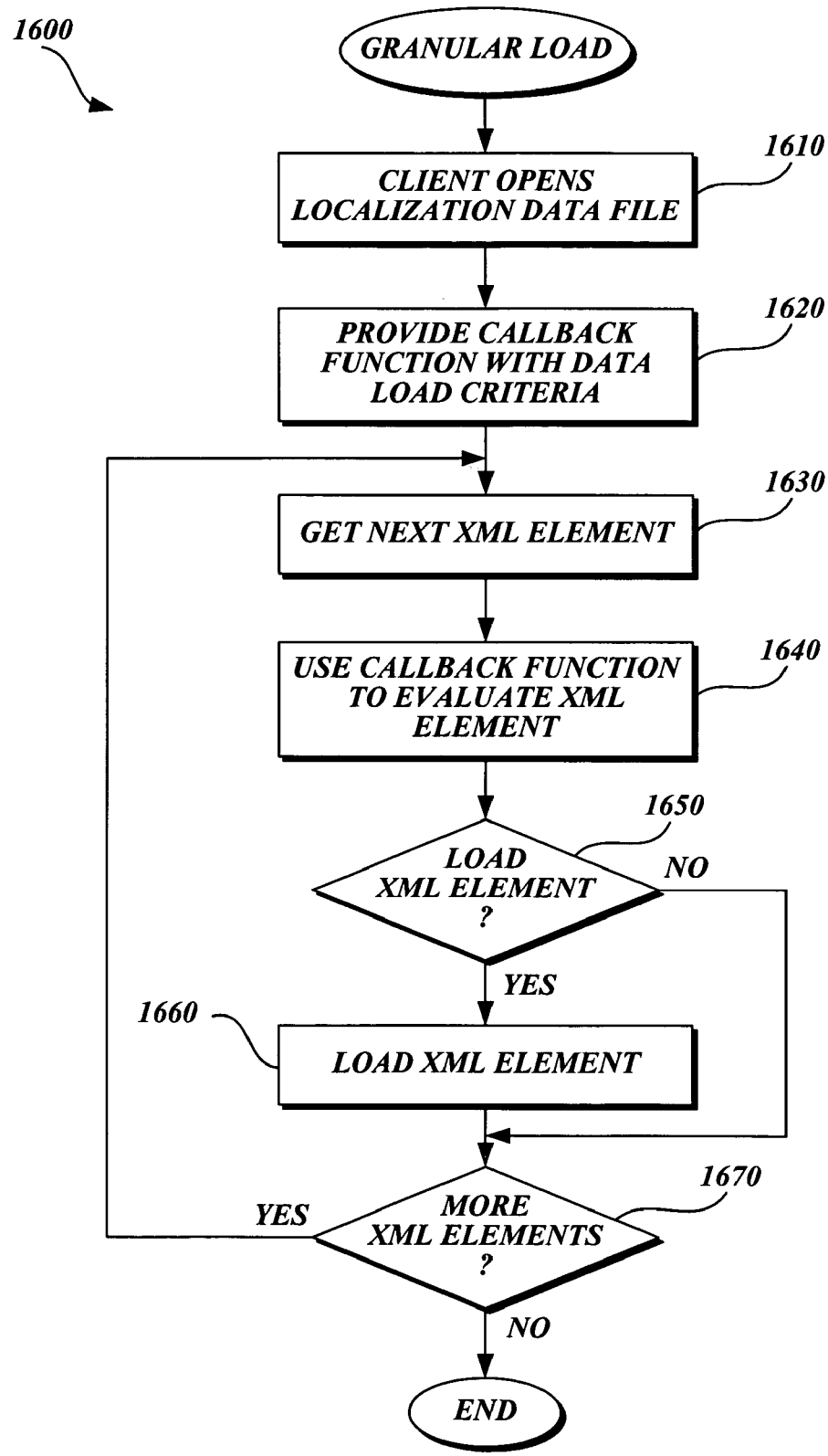
FIG. 16 is a functional flow diagram of an exemplary method of granular loading of data with a callback function.

FIG. 16 is a functional flow diagram of an exemplary method 1600 of granular loading of data with a callback function. In one embodiment, a client software application specifies data to be loaded at a fine granular level, including all types of data, such as string data and binary data. Granular loading of data is performed at a fine level within all data types, in contrast to the partial loading of data discussed above with respect to FIG. 15, which operates at the gross level of data types. In granular loading, the client software application provides specific criteria according to which each data element is loaded. In one exemplary embodiment, the client software application provides a callback function to the functional interface of the object model 1208 whereby the objects that retrieve the localization data from the localization data file determine whether to load each data element. The callback function uses the criteria for selection of data as defined by the client software application. In block 1610 the client software application opens the localization data file. The method 1600 proceeds to block 1620 where a callback function is provided by the client software application to the object from the object model 1208 accessing the localization data file. Next, in block 1630 an XML data element is obtained. As shown by block 1640', the object uses the callback function provided by the client software application to evaluate the XML data element for loading. Then, in block 1650 the method 1600 determines, based on the results from the callback function, whether to load the current XML data element. If the current XML data element is selected for loading, the method 1600 proceeds to block 1660, where the XML data element is loaded into memory and the method proceeds to block 1670. If the current XML is not selected for loading, the method 1600 proceeds to the block 1670. In block 1670, the method 1600 determines whether more XML data elements are available in the localization data file. If more XML data elements are available, the method 1600 proceeds back to block 1630 to obtain the next XML data element. Otherwise, the method 1600 terminates.

Figures 17A, 17B:
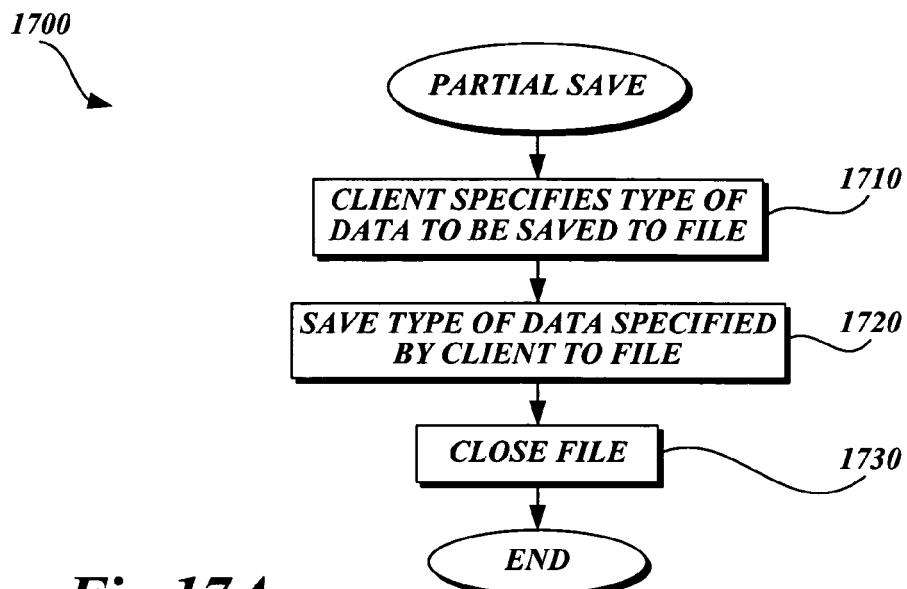
FIG. 17A is functional flow diagram of an exemplary method of partial saving of data.
FIG. 17B is a functional flow diagram of an exemplary method of merge on saving of data.

FIG. 17A is functional flow diagram of an exemplary method 1700 of partial saving of data. Partial save method 1700 is the complement of the partial load method 1500. A client software application that has localization data in memory ready to be saved to a data file may be required to save only part of the data. Partial save method 1700 allows the client software application to specify which data should be saved to the data file. For example, a client software application may be required to save only string data. The client software application can specify that only string data be saved to the data file. In block 1710, the client software application specifies the type of data to be saved to the data file. In block 1720, the data of the type specified by the client software application is saved to the data file. In block 1730, the data file is closed and method 1700 is terminated.

FIG. 17B is functional flow diagram of an exemplary method 1750 of merge on saving of data. Whether through partial or granular loading of data, discussed above, a client software application has only part of the data loaded in memory. If the data in the client software application's memory is saved as is, all data not initially loaded in the memory will be lost and not recorded in the output data file. To prevent loss of data, method 1750 merges the data in the client software application's memory with the data from the data file that was not initially loaded into the client software application's memory. To save the modifications made by the client software application to the loaded data, the memory copy of the data common to both the data file and the client software application's memory is saved. In block 1760 the original data file from which the localization data were loaded by the client software application is opened. In block 1770, the next available XML element is obtained from the data file. In block 1780, the method 1750 determines whether the current XML element obtained from the data file also exists in the memory of the client software application. If the current XML element exists in memory, the memory copy of the XML element is saved to the data file in block 1785. Next, the method 1750 proceeds to block 1790. In block 1780, if the current XML element does not exist in the memory, the current XML element had not initially been loaded, is unmodified, and therefore, need not be saved in the data file again. In this case, the method 1750 proceeds to block 1790. In block 1790, the method 1750 determines whether more XML elements remain in the data file. If there are more XML elements remaining, the method 1750 proceeds to block 1770 to obtain the next XML element. Otherwise, the method 1750 is terminated.

Figure 18:
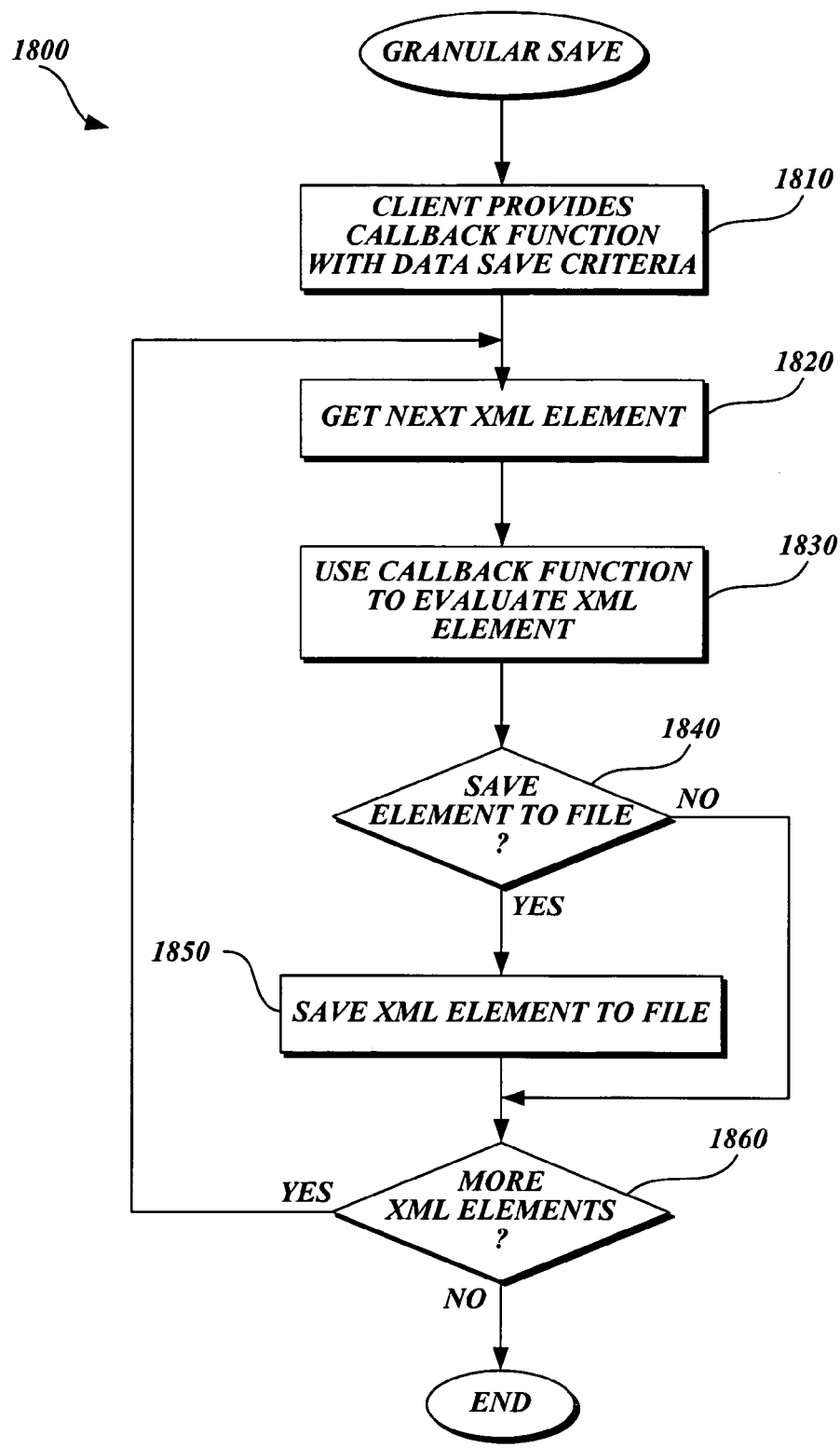
FIG. 18 is a functional flow diagram of an exemplary method of granular saving of data.

FIG. 18 is a functional flow diagram of an exemplary method 1800 of granular saving of data. The granular save method 1800 is the complement of the granular load method 1600. Similar to the granular load method 1600, the granular save method 1800 specifies whether each data element must be saved or not. In one embodiment, a client software application specifies data to be saved at a fine granular level, including all types of data, such as string data and binary data. Granular saving of data is performed at a fine level within all data types, in contrast to the partial saving of data discussed above with respect to FIG. 17A, which operates at the gross level of data types. In granular saving, the client software application provides specific criteria according to which each data element is saved. In one exemplary embodiment, the client software application provides a callback function to the functional interface of the object model 1208 whereby the objects that saves the localization data to the localization data file determine whether to save each data element. The callback function uses the criteria for selection of data as defined by the client software application. The method 1800 proceeds to block 1810, where a callback function is provided by the client software application to the object from the object model 1208 accessing the localization data file. In block 1820, an XML data element is obtained from the client software application's memory. In block 1830, the object uses the callback function provided by the client software application to evaluate the XML data element for saving. In block 1840, the method 1800 determines, based on the results from the callback function, whether to save the current XML data element. If the current XML data element is selected for saving, the method 1800 proceeds to block 1850, where the XML data element is saved to the data file and the method proceeds to block 1860. If the current XML is not selected for saving, the method 1800 proceeds to the block 1860. In block 1860, the method 1800 determines whether more XML data elements are available in the memory. If more XML data elements are available, the method 1800 proceeds back to block 1820 to obtain the next XML data element. Otherwise, the method 1800 terminates.

Figure 19:
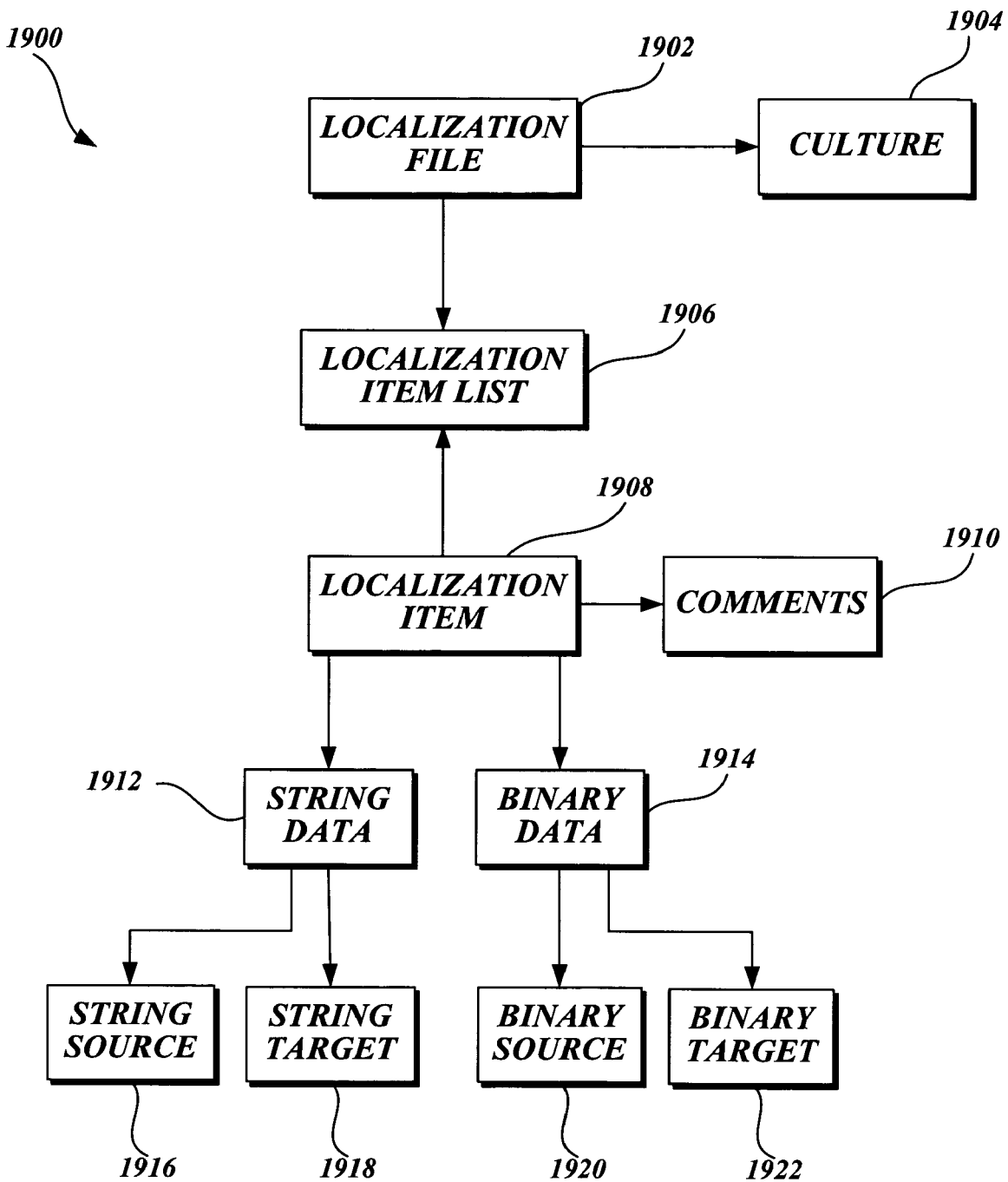
FIG. 19 is a pictorial diagram of an exemplary localization object model.

FIG. 19 is a pictorial diagram of an exemplary localization object model 1900. As indicated above, those skilled in the art recognize that an object model is an abstract representation of the relationships of different object types, or classes (abstract representation of objects), in a software system. An object model may be used to represent inheritance relationships as well as containment relationships between objects. The object model 1900 provides the specification for the types of objects and relationships that allow basic input and output functions with respect to data in the localization data files created based on the localization XML schema 1202. As discussed above, those skilled in the art will appreciate that the object model 1900 may apply to other types of data schema, and the discussion of the exemplary localization XML schema should not be construed as limiting the invention. The object model 1900 allows the splitting and merging of localization data files. Additionally, the object model 1900 allows the addition of information about the source and description of comments. The object model 1900 further allows the inclusion of referenced translations to provide help in the localization process. As discussed above with respect to FIG. 12, the object model 1900 closely corresponds to the localization XML schema 1202. That is, each class in the object model 1900 corresponds to one element in the localization XML schema 1202. Accordingly, a localization file 1902 is a class that represents a localization data file based on the localization XML schema 1202. The localization file class 1902 includes a culture class 1904 and a localization item list class 1906. The localization item list class 1906 is included in a localization item class 1908. In one embodiment, the localization item list class 1906 is a linear list, as opposed to a hierarchical structure, easily allowing the splitting of a localization data file 404 into partial data files 406 and merging the partial data files 406 back into a localization data file 408. The localization item class 1908 is the central class in the object model 1900 to which most other classes in the object model 1900 are related. In one embodiment, the localization item class 1908 includes a parent resource, a localization file, a resource ID, a localization item list (discussed below) of child localization items, a string data class (discussed below), a binary data class (discussed below), and a comment list of comments (discussed below).

The localization item class 1908 further includes a comments class 1910. In one embodiment, the comments class 1910 is part of a comment list class. Localization item class 1908 also includes a string data class 1912 and a binary data class 1914. The string data class 1912 includes a string source class 1916 and a string target class 1918. The string source data class 1916 provides a raw string and other string properties. The string target class 1918 includes localization information for the string. The binary data class 1914 includes a binary source class 1920 and a binary target 1922. The binary source class 1920 exposes an array of raw binary bytes and other binary properties. The binary target class 1922 provides binary status information. In another embodiment, the object model 1900 may include other classes such as a display information class and a resource ID class included in the localization item class 1908. In an exemplary embodiment, the string data class 1912 and the binary data class 1914 include a string reference class and a binary reference class (not shown). A reference class provides information about a reference language, which may be used to provide additional information for the translation of string and binary data from the source language to the target language.

Figure 20:
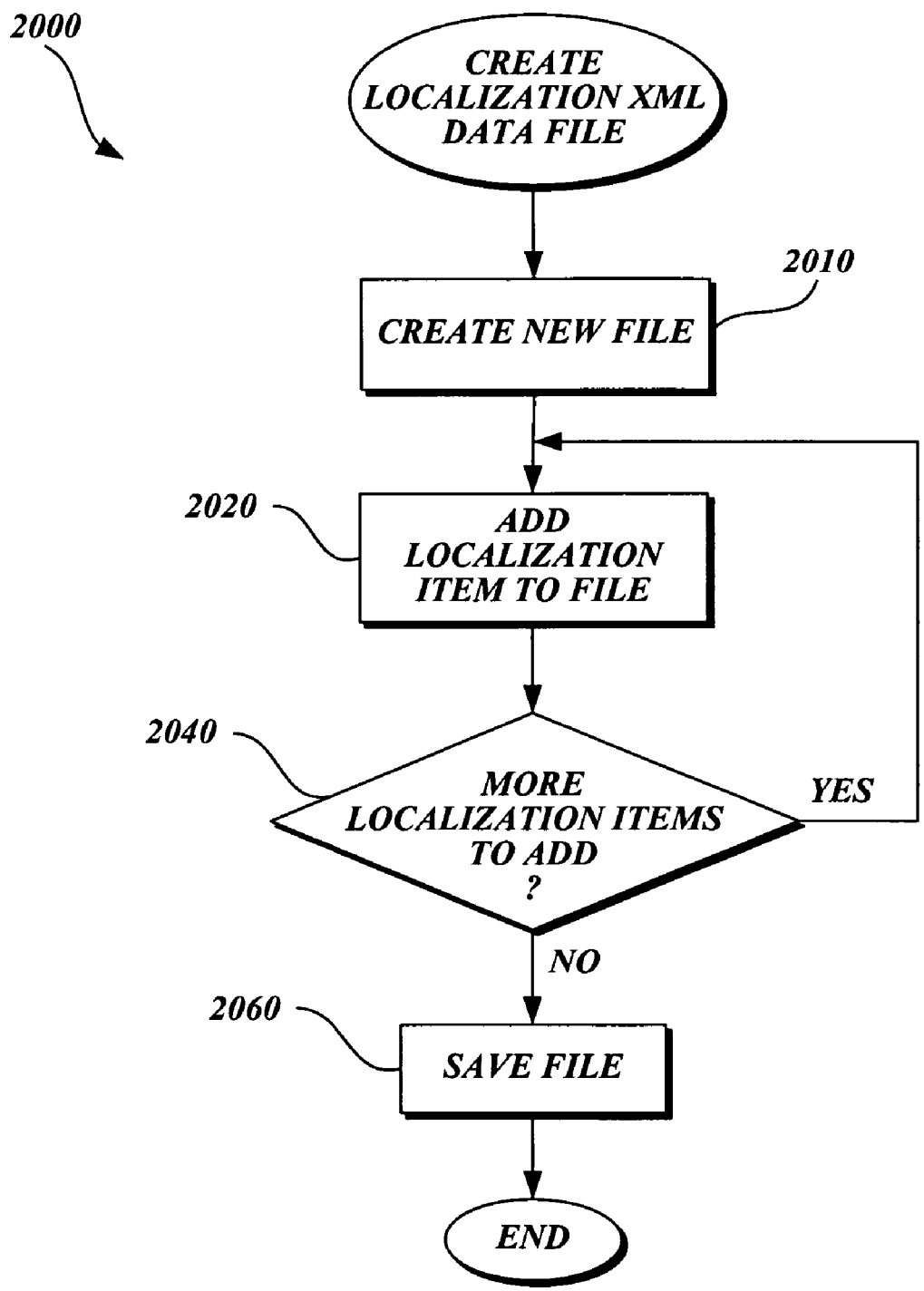
FIG. 20 is functional flow diagram of an exemplary method for creation and provisioning of a localization data file.

FIG. 20 is functional flow diagram of an exemplary method 2000 for creation and provisioning of a localization data file. In block 2010 a new localization data file is created. In block 2020, a localization item is added to the localization data file. In block 2040, the method 2000 determines whether more localization items remain to be added to the localization data file. If more localization items remain, the method 2000 proceeds to block 2020 where the localization item is added to the localization data file. Otherwise, the method 2000 proceeds to block 2060 where the localization data file is saved.

Figure 21:
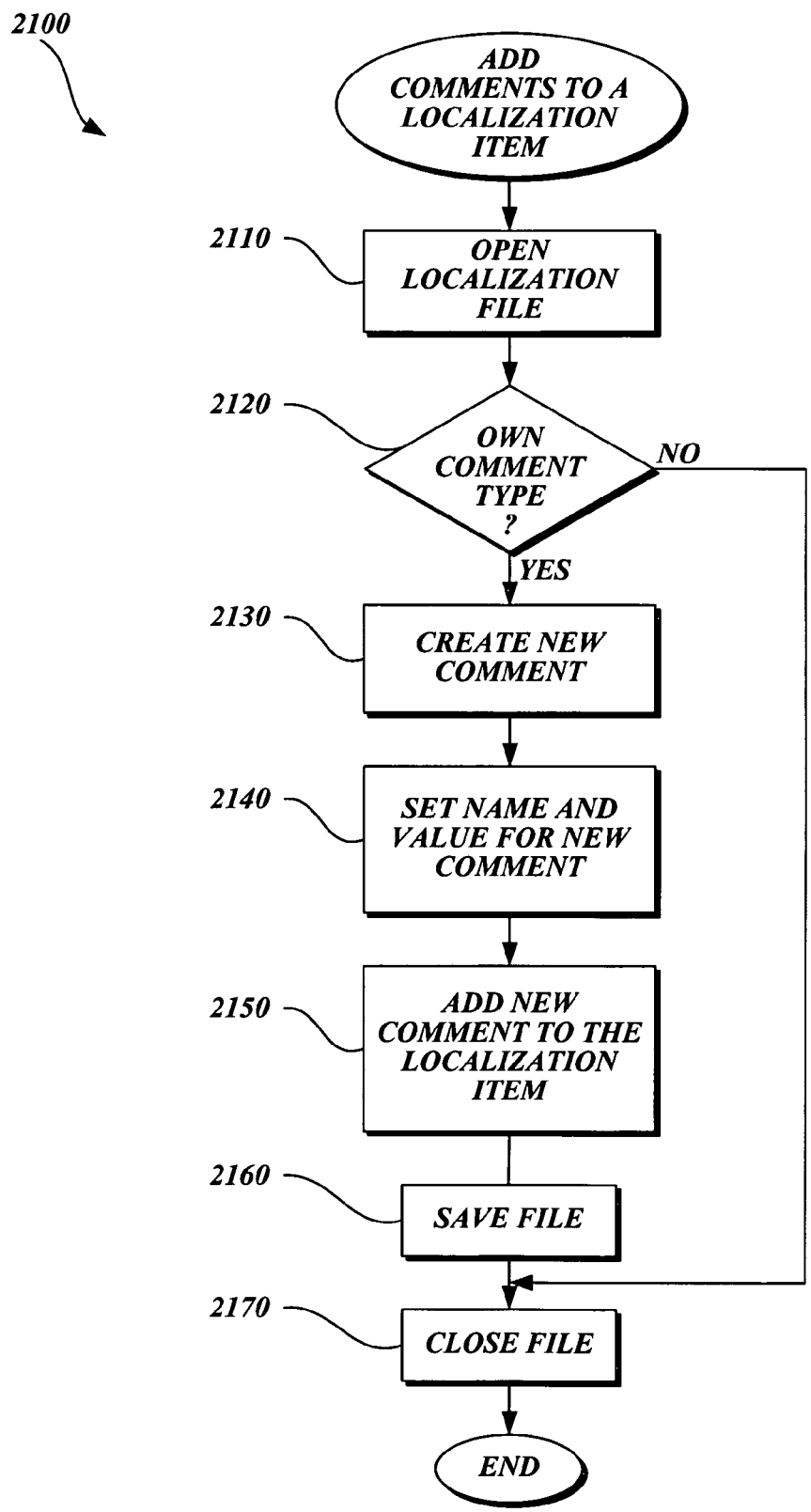
FIG. 21 is functional flow diagram of an exemplary method for addition of a comment to a Localization Item.

FIG. 21 is functional flow diagram of an exemplary method 2100 for addition of a comment to a Localization Item. The method 2100 requires input information from a client software application to identify the localization item to which the comment is to be added. As discussed above, instructions for localization may be embodied in comments that are associated with localization items. In block 2110, a localization data file is opened. In block 2120, the method 2100 verifies comment ownership rights of the client software application that is attempting to add comments to the localization item. If the client software application does not own the comment type added to the localization item, the method 2100 proceeds to block 2170, where the localization data file is closed. If the client software application owns the comment type, the method 2100 proceeds to block 2130, where a new comment is created. In block 2140, the name and value attributes of the comment are set to the desired values. In block 2150 the comment is added to the localization item. The method 2100 proceeds to block 2160, where the file is saved. In block 2170, the file is closed and the method 2100 terminates.

Figure 22:
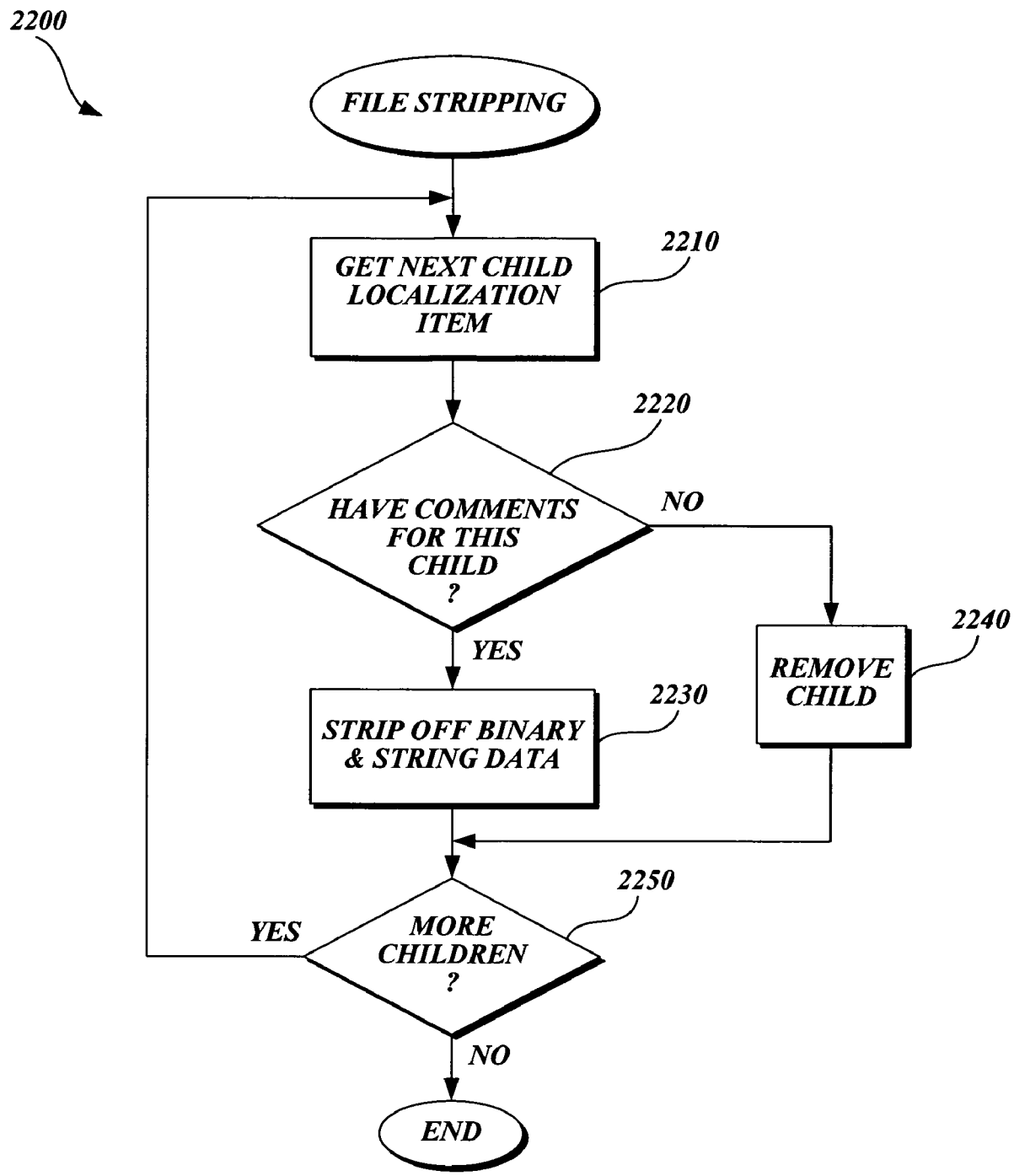
FIG. 22 is a functional flow diagram of an exemplary method for file stripping.

FIG. 22 is a functional flow diagram of an exemplary method 2200 for file stripping. All data that must not be saved to the localization data file is removed from the client software application's memory prior to saving the data. In one embodiment, the method 2200 removes all localization items that contain no comments. The binary information and strings are removed from all other localization items. In one embodiment, a recursive method is used, which includes a child localization item as input. The recursive method strips all binary and string information from the child localization item. A FALSE return value from a call to the recursive method implies that the child localization item provided as input to the recursive method and all the children of the child localization item have no comments, and the child localization item and all the children of the child localization item are removed. In block 2210, a child localization item is accessed. In block 2220, the method 2200 determines whether the child includes comments. If the child has comments, the method 2200 proceeds to block 2230, where binary and string data of the child localization item are discarded. If the child has no comments, then the child is removed in block 2240. In block 2230, the method 2200 proceeds to block 2250. In block 2240, the method 2200 proceeds to block 2250, where it is determined whether more child localization items remain. If more child localization items remain, the method 2200 proceeds to block 2210 where the next child localization item is accessed for evaluation. Otherwise, the method 2200 terminates.

While the presently preferred embodiment of the invention has been illustrated and described, it will be appreciated by those skilled in the art that various changes can be made therein without departing from the spirit and scope of the invention. For example, while the systems and methods described above are directed towards localization data using XML schema, other data format specifications may be used. Thus, the invention should not be construed as limited to the exemplary embodiments described above.

The invention claimed is:

1. A computer memory having computer-readable components for localization of data included in software programs, the computer-readable components, when executed by at least one processor, comprising:
   data elements defined by a software data schema; and
   an owned comment data element created by an associated owner, the owned comment data element comprising information about the localization of the data included in the software programs, only the associated owner having permission to manipulate the owned comment data element, the owned comment data element including a data field for enabling and disabling a processing of the owned comment data element, the owned comment data element included in other data elements,
   the data elements being used in a computer-implemented method, the method comprising:
   when the data field for enabling and disabling the processing of the owned comment data element indicates that the owned comment data element is enabled, merging at least two owned comment data elements having different ownerships, the merging comprising:
      when an ownership conflict between the at least two owned comment data elements having different ownerships does not arise, forming a single owned comment data element representing the at least two owned comment data elements, and
      issuing an error message when, during the merging, an owned comment data element of the at least two owned comment data elements that is not associated with an owner comprising a file or a tool is disabled.

2. The computer memory of claim 1, wherein the software data schema is an extensible markup language ("XML") schema.

3. The computer memory of claim 1, wherein the owned comment data element comprises instructions relating to the localization of data included in the software programs for at least one of a software localization tool and a human operator.

4. The computer memory of claim 1, wherein the owned comment data element includes a description of the owned comment data element and information about the ownership of the owned comment data element.

5. A computer memory having computer-readable components for localization of data included in software programs, the computer-readable components, when executed by at least one processor, comprising:
   data elements defined by a software data schema; and
   an owned comment data element created by an associated owner, the owned comment data element comprising information about the localization of the data included in the software programs, only the associated owner having permission to manipulate the owned comment data element, wherein:
   the owned comment data element includes a data field for enabling and disabling a processing of the owned comment data element,
      the owned comment data element is included in other data elements, and
      the owned comment data element is included in a list of owned comment elements comprising at least one owned comment data element; and
   the data elements being used in a computer-implemented method, the method comprising:
   when the data field for enabling and disabling the processing of the owned comment data element indicates that the owned comment data element is enabled, merging the owned comment data element with at least one another owned comment data element having ownership different from ownership of the owned comment data element, the merging comprising:
   when an ownership conflict between the owned comment data element and the at least one another owned comment data element does not arise, forming a single owned comment data element representing the owned comment data elements; and
   issuing an error message when during the merging an owned comment data element of the at least two owned comment data elements that is not associated with an owner comprising a file or a tool is disabled.

6. The computer memory of claim 5, wherein the software data schema is an, extensible markup language ("XML") schema.

7. The computer memory of claim 5, wherein the owned comment data element comprises instructions relating to the localization of data included in the software programs for at least one of a software localization tool and a human operator.

8. The computer memory of claim 5, wherein the owned comment data element includes description of the owned comment data element and information about ownership of the owned comment data element.

9. The computer memory of claim 5, wherein one of the at least two owned comment data elements, which provides conflicting information and instructions with the other of the at least two owned comment data elements, is disabled.

10. The computer memory of claim 5, wherein the owned comment data element includes an associated version data field and an associated date data field and wherein the computer-implemented method further comprises processing the owned comment data element by software localization tools, which provide information about the owned comment data element by issuing messages.

11. The computer memory of claim 10, wherein the software localization tools are the associated owners of the owned comment data elements.

12. The computer memory of claim 10, wherein the owned comment data elements contain a comment type included in an ownership list.

13. A computer method of processing an owned comment data element stored on a computer for localization of data included in software programs executed by the computer, the method comprising:
   providing a source file including the owned comment data element as an input to a comment extractor tool executed by the computer;
   accessing, by the comment extractor tool, the owned comment data element included in the source file, the source file including data and instructions;
   based on a data field in the owned comment data element for enabling and disabling the owned comment data element, determining whether the owned comment data element is enabled; and
   if the owned comment data element is enabled,
      extracting, by the comment extractor tool, the owned comment data element from the source file by interpreting and executing instructions embedded in the owned comment data element, and
      producing, by the comment extractor tool, an output file including the extracted owned comment data element, the output file including instructions for localization of the data;
   merging the owned comment data element with a second owned comment data element having a different ownership, the merging comprising issuing an error message when the second owned comment data element is not associated with an owner comprising a file or a tool and is disabled; and
   wherein when a more recent version of a file that owns a comment data element is available, an information message is issued indicating that the comment data element is ignored.

14. The computer method of claim 13, wherein the output file is a data file created based on a software data schema and wherein the output file includes other data elements.

15. The computer method of claim 14, wherein the software data schema is an extensible markup language ("XML") schema.

16. The computer method of claim 13, wherein at least two owned comment data elements are merged one with another to form a single owned comment data element representing the at least two owned comment data elements.

17. The computer method of claim 13, wherein the owned comment data element has an existing owner and wherein the ownership of the owned comment data element is transferred from the existing owner to a new owner.

18. The computer method of claim 13, wherein the comment extractor tool adds comments to the software programs and tags the comments to indicate that the comment extractor tool is an owner of the comments.

* * * * *